May 11, 1937.  S. J. FINN  2,080,036
MACHINE FOR APPLYING PRESSURE TO SHOE BOTTOMS
Filed June 14, 1934  7 Sheets-Sheet 1

INVENTOR
Sidney J. Finn
By his Attorney
Harlow M. Davis

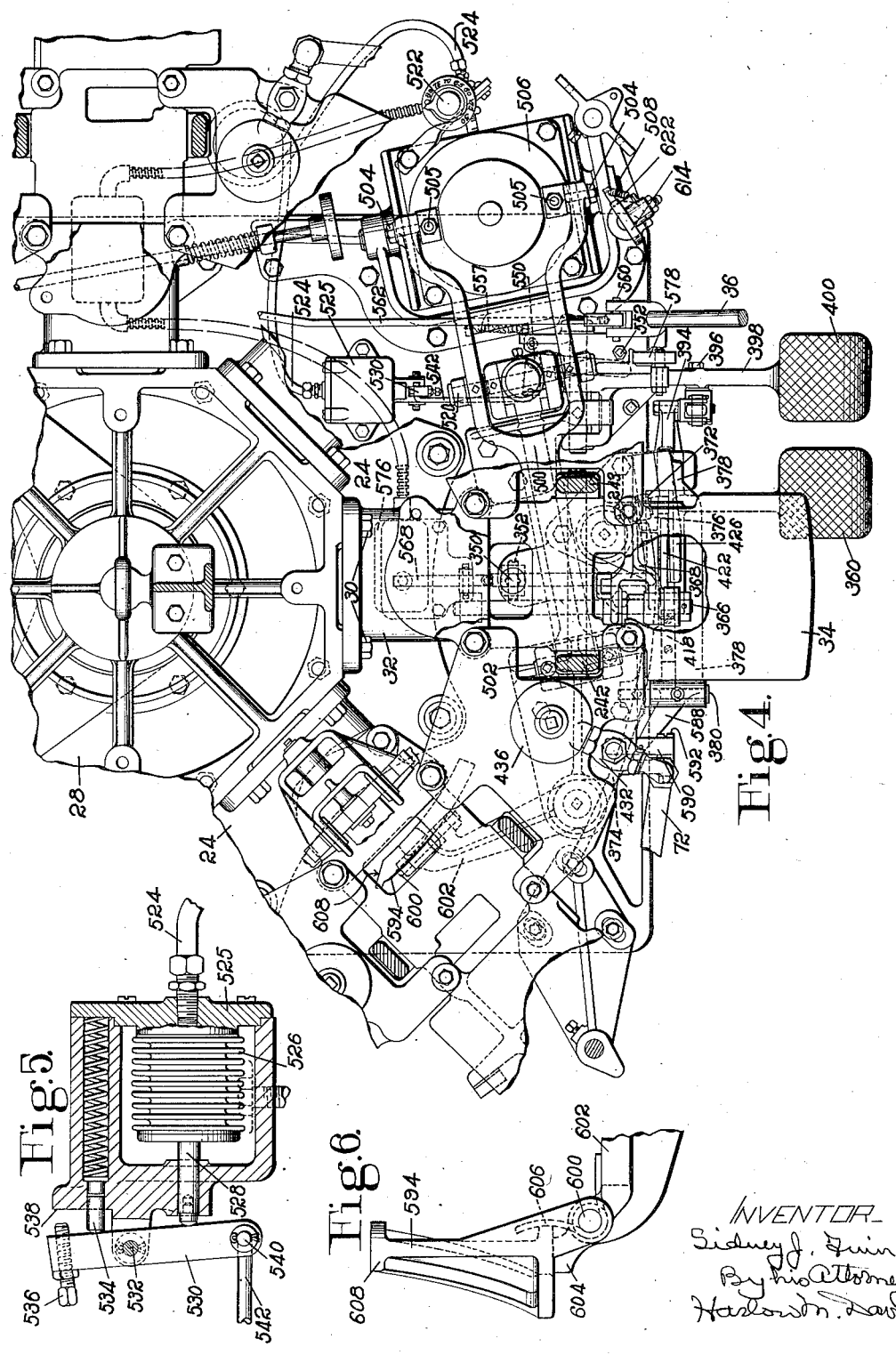

May 11, 1937.  S. J. FINN  2,080,036
MACHINE FOR APPLYING PRESSURE TO SHOE BOTTOMS
Filed June 14, 1934   7 Sheets-Sheet 3
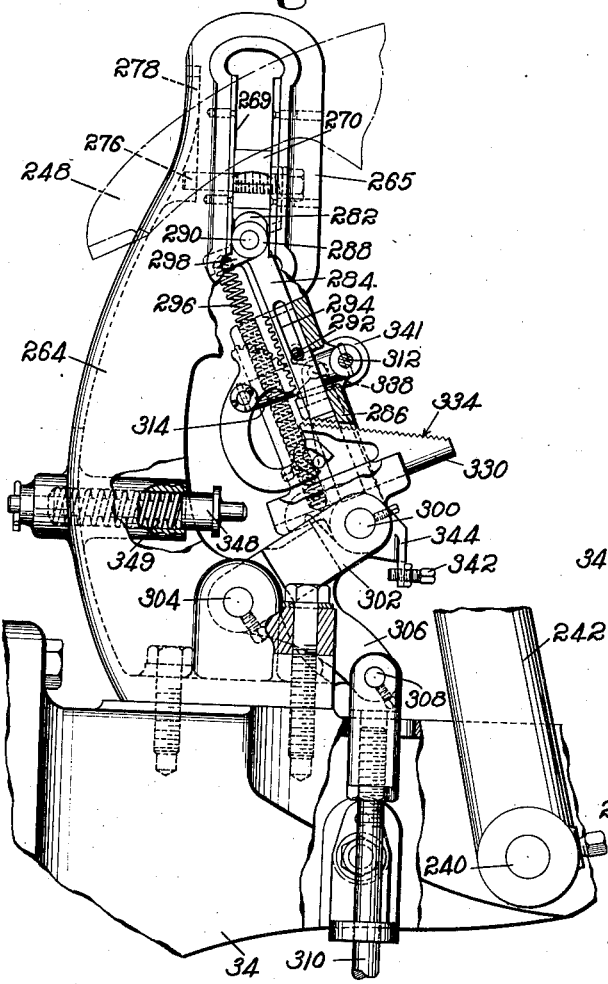
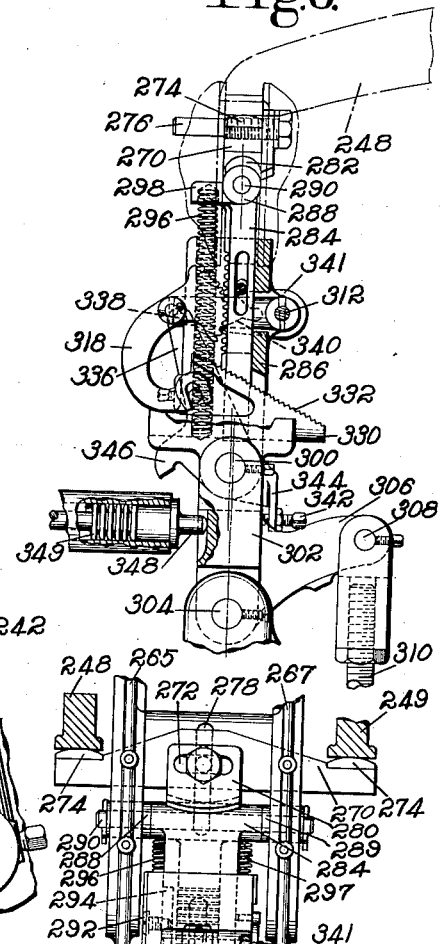
INVENTOR
Sidney J. Finn
By his Attorney
Harlow B. Davis

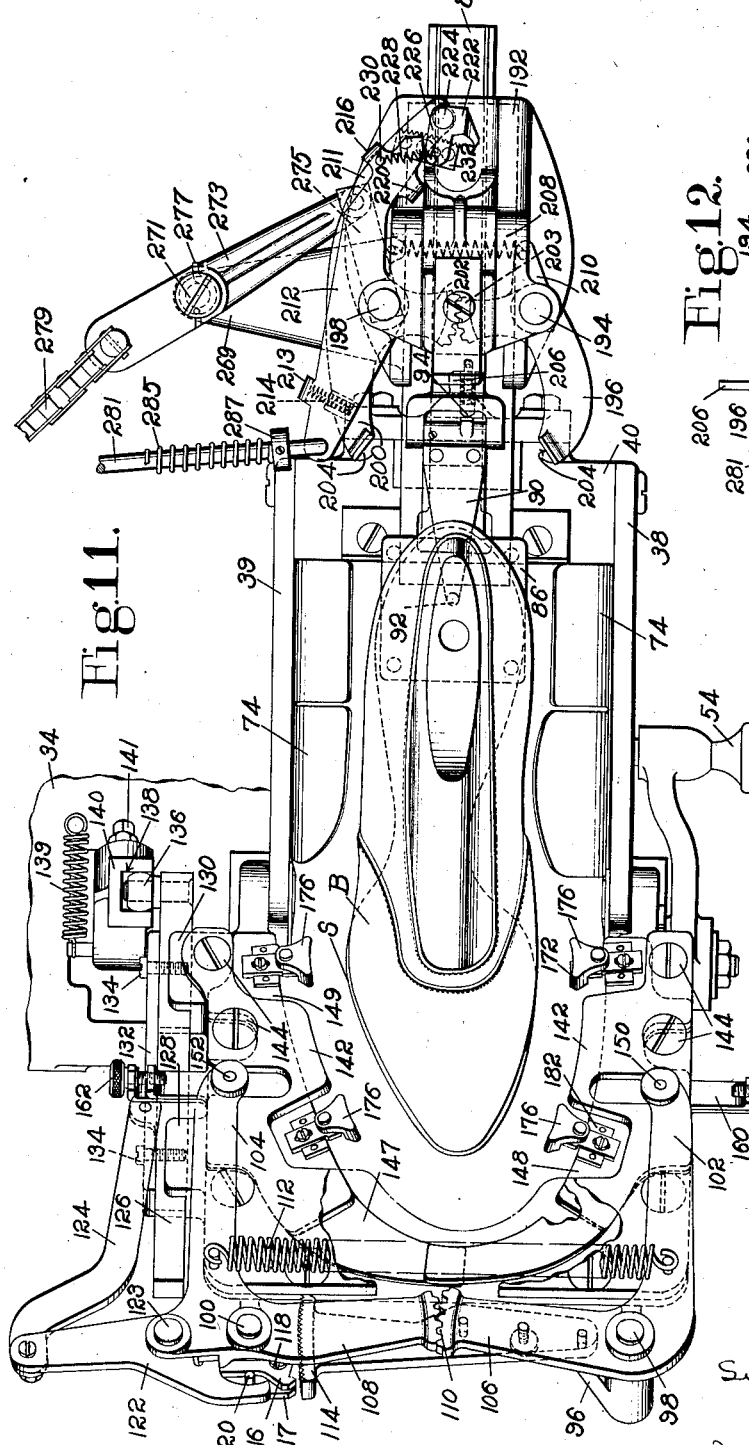
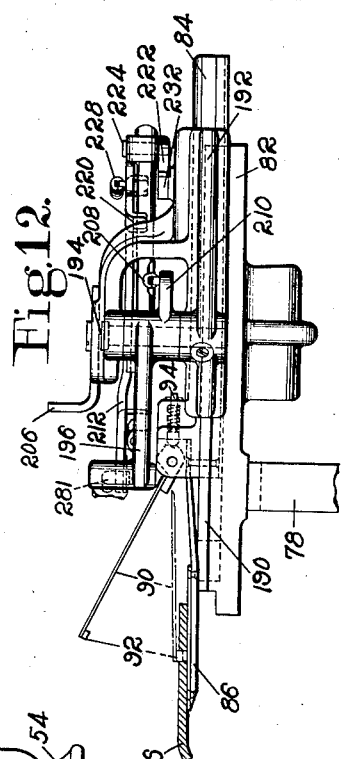
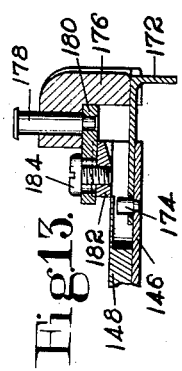

May 11, 1937.　　　　S. J. FINN　　　　2,080,036
MACHINE FOR APPLYING PRESSURE TO SHOE BOTTOMS
Filed June 14, 1934　　　7 Sheets-Sheet 5

INVENTOR
Sidney J. Finn
By his Attorney
Harlow M. Davis

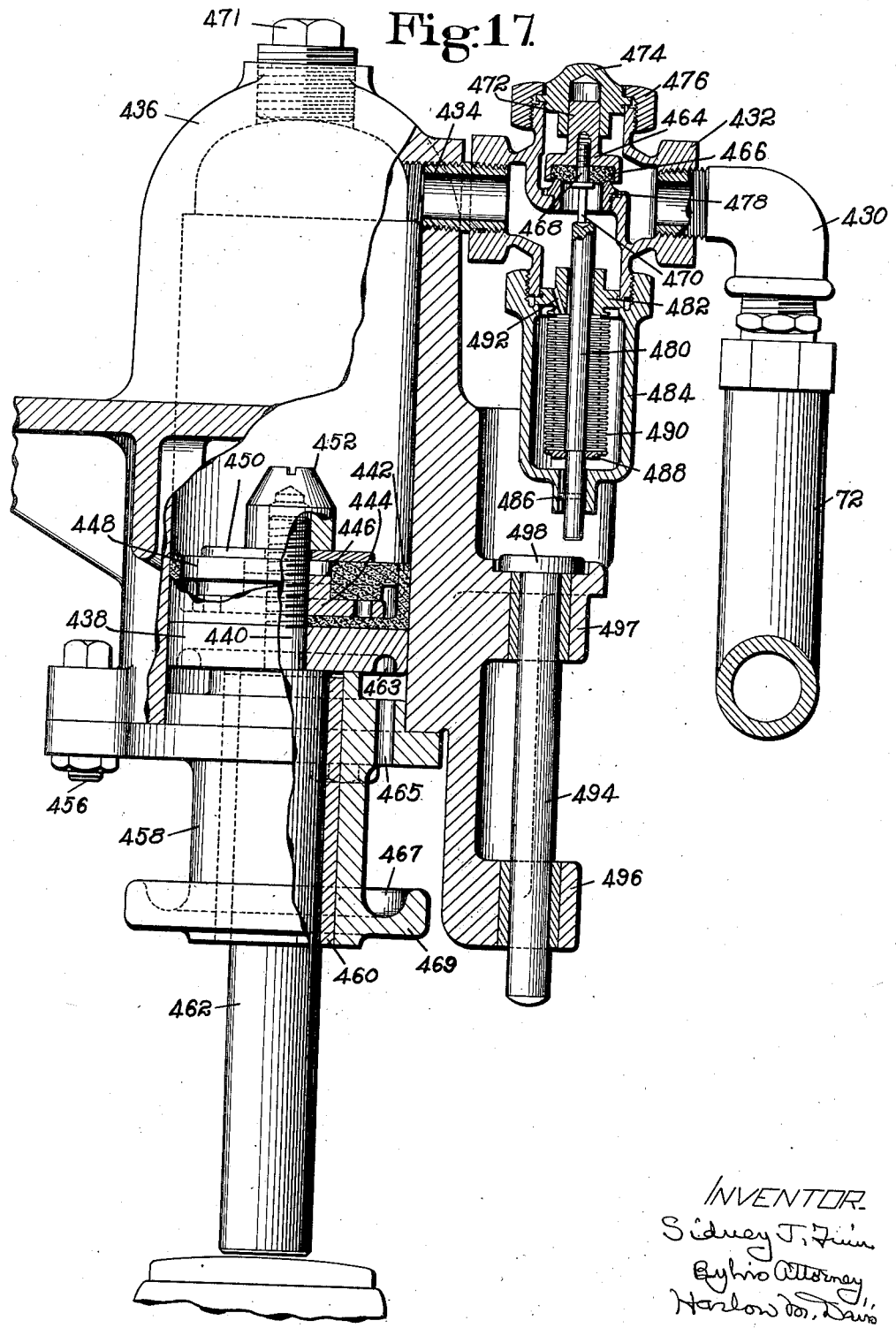

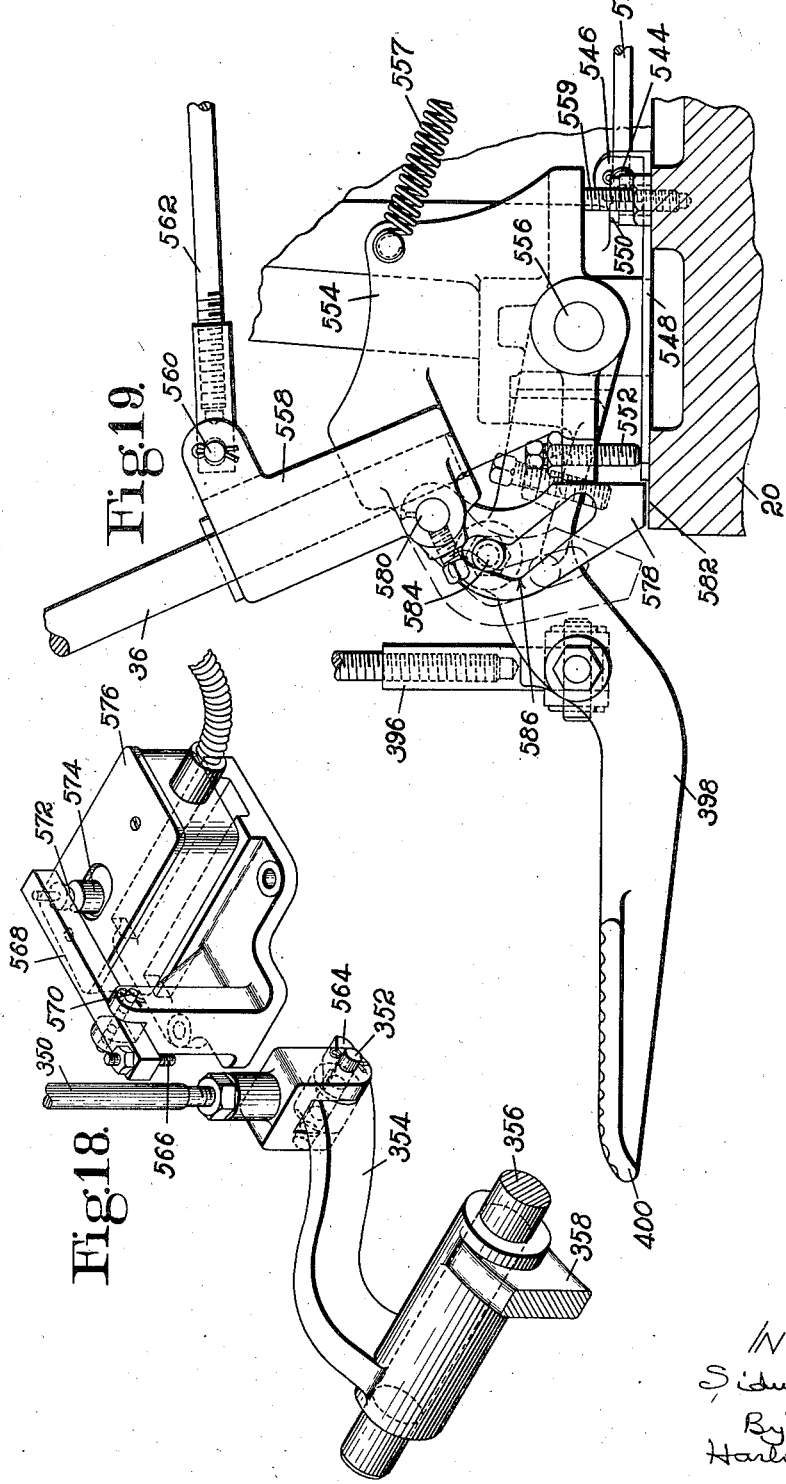
May 11, 1937. S. J. FINN 2,080,036
MACHINE FOR APPLYING PRESSURE TO SHOE BOTTOMS
Filed June 14, 1934 7 Sheets-Sheet 7

Patented May 11, 1937

2,080,036

UNITED STATES PATENT OFFICE 2,080,036

MACHINE FOR APPLYING PRESSURE TO SHOE BOTTOMS

Sidney J. Finn, Beverly, Mass., assignor to United Shoe Machinery Corporation, Paterson, N. J., a corporation of New Jersey Application June 14, 1934, Serial No. 730,650

114 Claims. (Cl. 12—37)

This invention relates to machines for use in applying pressure to shoe bottoms, for example for use in cement-attaching soles to shoes. The invention is illustrated herein as embodied in a cement sole-attaching machine of the general type disclosed in Letters Patent of the United States No. 2,047,185, granted July 14, 1936, upon an application filed in the names of Milton H. Ballard et al. It should be understood, however, that the invention is not limited in its utility to embodiment in machines of that type.

Objects of the invention are to provide improved mechanism for applying pressure to shoe bottoms; to provide an improved pad to engage shoe bottoms thereby to apply pressure thereto or to sustain the thrust of pressure otherwise applied; and to provide improved mechanism for relatively locating the shoe and sole on a pad prior to the application of pressure thereto.

Among the important features of the invention are the following:

An organization which comprises novel means for preliminarily sinking shoes into the surface of the respective pads a predetermined amount irrespective of the size of the shoe and the height of the last prior to the application of the full pressure exerted by the machine; an organization in which an electro-hydraulic unit is utilized to apply the pressure to the shoes on the pads, preferably by forcing liquid into the hollow interiors of the pads; a construction in which the electro-hydraulic unit previously mentioned is utilized successively to move the pistons of a series of cylinders connected with the respective pads, thereby to inflate the pads; improvements in mask plates arranged to cover the marginal portions of a pad and to leave exposed an area not much larger than the bottom of the shoe which is to be operated upon; and improvements in gage mechanism positioning the soles and shoes relatively to each other on the pads.

These and other features of the invention will appear more clearly from the following detailed description when read in connection with the accompanying drawings and will be pointed out in the appended claims.

In the drawings,

Fig. 4 is a partial plan view of the machine, four of the arms of the turret and the pad boxes being omitted;

Fig. 5 is a sectional detail of parts shown in Fig. 4;

Fig. 6 is a detail in perspective of parts shown in Fig. 4;

Fig. 7 is a side elevation, partly in section, of the preliminary pressure mechanism;

Fig. 8 is a view similar to Fig. 7 with the parts in pressure-applying position;

Fig. 9 is a front elevation of parts shown in Fig. 7;

Fig. 10 is a detail in perspective of parts shown in Figs. 7, 8 and 9.

Fig. 11 is a plan view of one of the pads showing the sole and shoe locating mechanism;

Fig. 12 is a side elevation of the sole and shoe locating mechanism;

Fig. 13 is a sectional detail of one of the forepart sole and shoe gages;

Fig. 17 is a view, partly in section, of the cylinder and piston for forcing liquid into the pad;

Fig. 18 is a detail in perspective of the treadle mechanism for applying preliminary pressure and controlling power operation of the machine; and Fig. 19 is an elevational detail of the gage-controlling treadle and the starting lever by which rotation of the turret is controlled.

Figure 1:
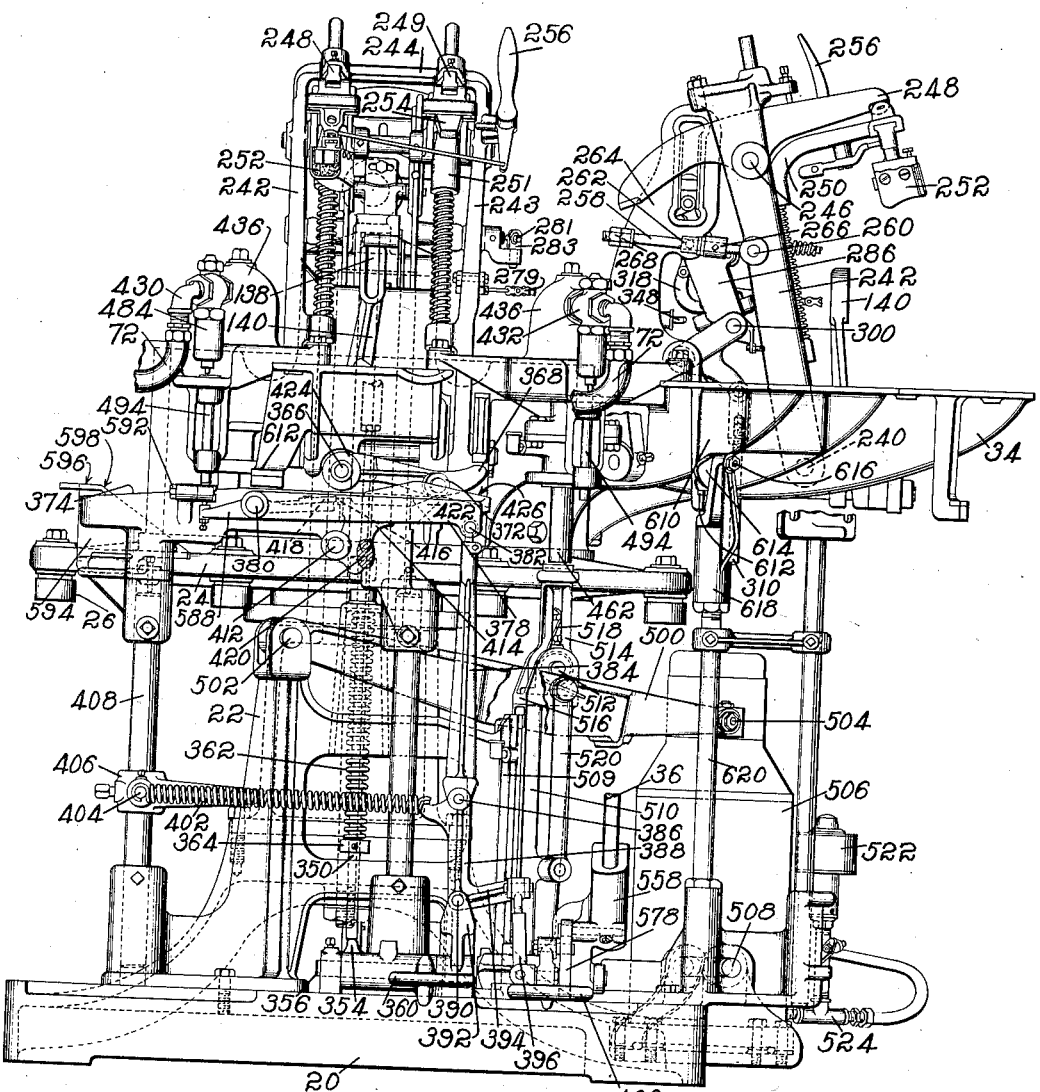
Fig. 1 is a front elevation of the machine.

The illustrated machine, by which a shoe and sole are properly located relatively to each other upon an inflatable pad, preliminary pressure applied to the shoe to sink it into the pad and the pad inflated to apply final pressure to the shoe, comprises a base 20 (Fig. 1) on which is a frame or column 22 rotatably supporting a spider 24 carrying rolls 26 which cooperate with mechanism as disclosed in the patent above referred to for rotating the spider and the parts connected therewith which constitute a turret. These parts comprise an octagonal hub portion 28 (Fig. 4) to which are secured at 30 radially extending pad-carrier brackets 34. The outer portions of the brackets 34 have flat upper faces to each of which a pad box is secured. Intermittent rotation of the spider 24 and the frame 28 to present the pad boxes on the brackets 34 successively at an operating station (shown at the bottom of Fig. 4) is controlled by a clutch trip lever 36.

Figure 14:
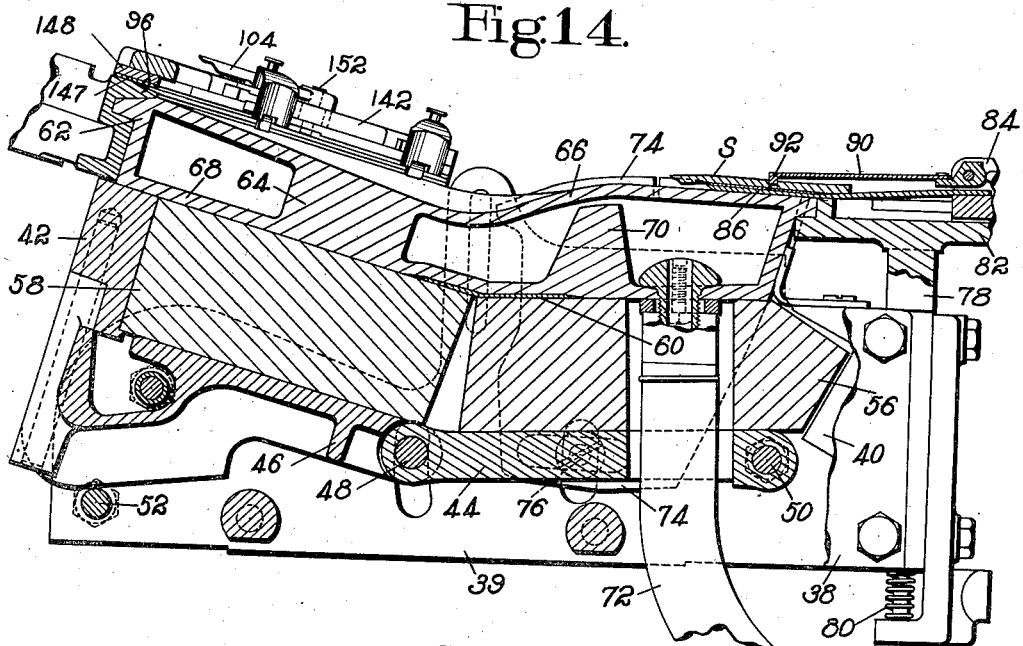
Fig. 14 is a sectional view of one of the pads and pad boxes.

On the horizontal surface of each bracket 34 is mounted a pad box having the construction shown in Figs. 11 and 14 which, except for the parts hereinafter described, is similar to the pad box disclosed in the above-mentioned patent. Briefly considered, the box comprises side members 38, 39, a rear end member 40, a front end member 42 (Fig. 14), and two bottom members 44, 46 which are pivoted to each other at 48, the rear end of the member 44 being pivoted at 50 to the sides 38, 39, and the bottom member 46 resting slidably on a pin 52 extending transversely of the box between its sides. The pivot 48 is adjustable up and down by operation of a handle 54, shown in Fig. 11, as in the prior construction. Resting on the member 44 is a block 56 of wood or rubber, and resting on the bottom member 46 is a similar block 58. Overlapping the joint between the blocks 56 and 58 is a sheet 60 of flexible material and on the upper surface of the blocks is supported a hollow rubber pad 62 which is preferably formed in a single piece and may be substantially similar to the pad disclosed in Letters Patent of the United States No. 2,030,915 granted February 18, 1936, upon my application. At the portion of the pad which is to be engaged by the central portion of the forepart of the shoe there is a vertical column 64 of rubber connecting the top wall 66 and the bottom wall 68, and preferably under the portion of the pad which is to be engaged by the rear part of the shank portion of the shoe is a column 70 integral with the bottom wall 68 of the pad but unconnected to the top wall 66. It is to be understood that the columns 64, 70 do not extend laterally the full width of the pad but that liquid forced into the hollow portion of the pad can circulate around the columns and apply pressure to the wall 66 of the pad at all portions thereof which lie beneath the peripheral portion of the shoe bottom.

A hose 72 is connected to the cavity in the pad and through this hose the inflating medium is conducted to inflate and deflate the pad. The rear portion of the pad is held in the box by plates 74 the upper ends of which are bent over the top of the pad, as shown in Fig. 11, the plates extending downwardly between the pad and the walls 38, 39 of the box and having their lower ends connected at 76 to the bottom member 44 so that when the bottom members are adjusted the plates 74 will move with them and maintain the same relation to the pad. At the rear end of the box is a slide 78 arranged for vertical movement and yieldingly upheld by springs 80. On the upper end of the slide 78 is a head 82 on which mechanism for locating the rear end of the sole and shoe is mounted, as best shown in Figs. 11, 12 and 14.

In the central portion of the head 82 is formed a T-way to receive a slide or carrier 84 which moves freely longitudinally of the pad and carries at the end next to the pad a plate 86 upon which the rear end of the sole may rest, the plate being preferably covered by a piece of leather or similar material. The plate 86 prevents the pressure applied to the shoe from turning up the marginal portion of the sole about the heel end of the shoe and thus facilitates the heel-seat-fitting operation which is subsequently to be performed on the rear portion of the sole. Pivoted to the carrier 84 above the plate 86 is a tongue 90 carrying a pin 92, the pin being adapted to engage a hole formed in the heel-seat portion of a sole S, as indicated in dotted lines in Fig. 12. A spring detent 94 is provided to hold the tongue either in the elevated full-line position, as shown in Fig. 12, or in the horizontal dotted-line position there shown. After the sole S has been placed on the plate 86 and the hole in its rear end engaged by the pin 92, which of course locates the plate 86 in proper relation to the rear end of the sole, the carrier 84 may be moved longitudinally of the pad with the sole to locate the sole at any desired position on the pad, preferably with its ball line aproximately over the adjustable pivot 48 on the bottom of the pad box.

The forepart of the sole is then located by mechanism shown in Fig. 11. Surrounding the forepart of the pad box is a frame 96 (Fig. 14) which supports two pivot studs 98, 100 on which two angle levers 102, 104 are pivoted. Shorter arms 106, 108 of the angle levers are provided with interengaging teeth 110 so that the arms 102, 104 move equally and oppositely relatively to each other. A tension spring 112 is connected between these arms to urge them toward each other.

Figure 15:
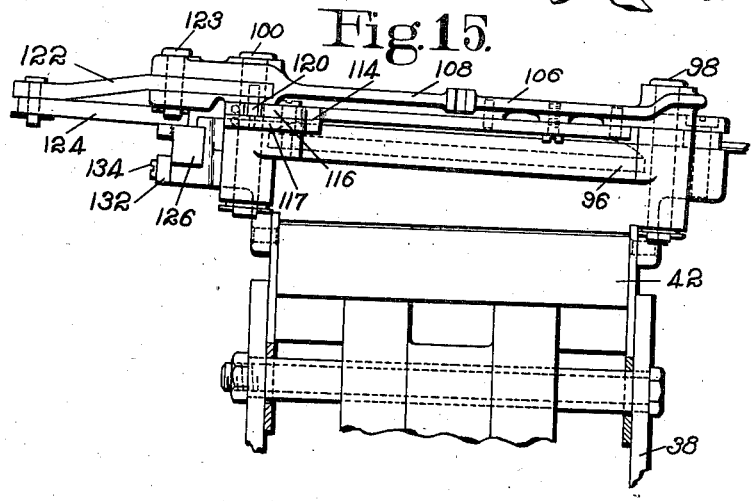
Fig. 15 is a front end elevation of the pad box shown in Fig. 11.

To lock the arms 102, 104 against movement away from each other, the arm 106 has secured thereto or formed integral therewith a toothed segment 114 with which a pair of pawls 116, 117, spring pressed toward the segment, cooperates. The pawls 116, 117 are pivoted at 118 on a lug forming part of the box frame 96, and the pawl 117 is provided with a pin 120 which overlies the tail of the other pawl so that pressure on the pin will release both pawls. A lever 122 is pivoted at 123 to the arm 104 adjacent to its pivot 100, one arm of the lever 122 engaging the pin 120 and the other arm of the lever being connected by a link 124 to a slide 126 mounted for movement longitudinally of the pad box in ways formed in lugs 128, 130 formed on the frame 96, the slide 126 being held in place by a gib plate 132 held in place by screws 134 which pass through the plate 132 and enter threaded holes in the lower parts of the lugs 128, 130 (Fig. 15). The right-hand end of the slide 126 (Fig. 11) carries a stud on which is a roll 136 engaging a substantially vertical slot 138 in an arm 140 which is urged toward the right by a spring 139 until a stop screw 141 carried thereby engages the bracket 34. The arm 140 is operated in a manner to be later described. Movement of the arm 140 to the left will cause the slide 126 to push on the link 124, operate the lever 122 to release the pawls 116, 117 from the segment 114, and then swing the arm 104 about its pivot 100 outwardly of the pad 66, the interengaging teeth 110 causing the opposite arm 102 to swing equally and oppositely outwardly of the pad. Conversely, movement of the arm 140 toward the right will allow the spring 112 to move the arms 102, 104 equally and oppositely toward each other and when movement of the arms is arrested will allow the pawls 116, 117 to engage the segment 114 and lock the arms against movement away from each other. It will be understood that the pawls 116, 117 have a differential action, the tooth of one of the pawls being located in advance of the other a distance equal to half the space between the teeth on the segment 114.

Figure 16:
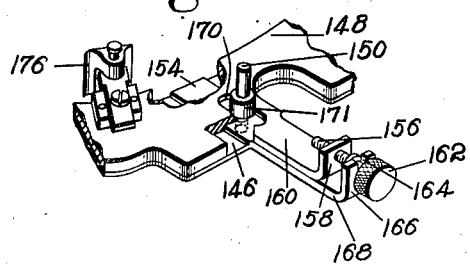
Fig. 16 is a detail in perspective of parts shown in Fig. 11.

Extending about the forepart of the pad is a cover plate 142 secured by screws 144 to the frame 96 and spaced heightwise therefrom to receive beneath it a mask plate which is in two sections, one of the sections being located at each side of the shoe and comprising a thin lower plate and a thicker upper plate (Figs. 13 and 16). A thin lower plate 146 at one side of the shoe is pivoted to the arm 102 by a pin 150 (Fig. 11), and a thin lower plate 147 at the other side of the shoe is pivoted by a pin 152 to the arm 104, so that movement of the arms toward each other will move these two lower portions of the mask plate toward each other. The lower plate 146

(Fig. 16) is provided with a rib 154 which enters a groove in the lower face of a thicker upper plate 148 so that the plates 148, 146 cannot turn relatively to each other in a plane parallel to the plane of the pad 66 but can move relatively to each other in the direction of the rib 154, the rib and corresponding groove constituting a spline connection between the plates 148, 146. The thin plate 147 at the other side of the pad is similarly connected to a thick upper plate 149. For relatively adjusting the plates 146, 148 in the direction of the rib 154 a screw 156 (Fig. 16) is provided. The screw 156 is threaded through an upturned lug 158 on a tongue 160 formed integrally with the plate 148 and is provided near its head 162 with a groove which engages a notch 164 in the upturned end 166 of a tongue 168 formed integrally with the plate 146. Turning of the screw 162, therefore, will adjust the plate 148 relatively to the plate 146 in a direction determined by the direction of the rib 154, the section 148 being slotted at 170 to prevent interference of the pin 150 with such adjustment and the pin having a stop collar 171 loosely fitting the slot 170. At the other side of the shoe the thin plate 147 and the associated thicker plate 149 are provided with similar adjusting means. Each of the plates 146, 147 is provided with two sole gages 172, best shown in Fig. 13, each of which comprises a horizontal portion loosely pivoted on a stud 174 fixed in the plate 146 and a vertical portion adapted to engage the edge face of the sole S and to rest at its lower end against the top surface of the wall 66 of the pad. Directly over each of the sole gages 172 is a shoe gage 176 which is mounted for limited vertical movement upon a stud 178 fixed at its lower end in a plate 180, which plate is seated in a groove formed in the top face of a block 182 fixed to the top of the plate 148. A screw 184 passes through a slot in the plate 180 and is threaded into the block 182, this screw-and-slot connection permitting adjustment of the gage 176 relatively to the gage 172 toward and from the sole S. Preferably the lower face of the gage 176 is recessed to receive the upper portion of the gage 172 so that the gage 172 cannot swing on its stud 174 relatively to the gage 176. The shoe-engaging faces of the gages 176 are curved in parallelism to the side of the shoe to increase their area of contact and prevent marring of the shoe, that is, the said faces are cylindrically concave. The gages 176 can also swing on the studs 178 sufficiently to insure full contact of their shoe-engaging faces with the shoe and can move upwardly on the studs 178 if forced to do so by upward pressure of the gages 172, due to inflation of the pad or for any other reason. The thin plate 147 of the mask plate at one side of the pad, as shown at the top of Fig. 11, is extended around the toe of the shoe substantially to meet the corresponding shorter plate 146 shown at the bottom of the figure. Similarly, the thick mask plate 148 shown at the bottom of Fig. 11 is extended around the toe substantially to meet the shorter plate 149 shown at the top of the figure. By this overlapped arrangement the effect of a substantially continuous mask plate around the forepart of the pad is secured while movement of the plates on one side of the pad relatively to movement of the plates on the other side of the pad is permitted about their respective pivots 150, 152 to adapt the mask plate as a whole to the foreparts of shoes of different sizes.

After the rear end of the sole S has been located as already indicated and as illustrated in Fig. 11, the arm 140, which, as will be explained, is under the control of the operator, is moved or is allowed to move toward the right, thereby moving the slide 126 in the same direction, movement of the slide permitting the spring 112 to act to swing the arms 102, 104 toward each other, thus moving the portions of the mask plate on each side of the forepart of the shoe toward each other until the sole gages 172 carried by the plates 146, 147 of the mask plate engage the edge face of the sole. It will be seen that one pair of gages 172 is located substantially at the ends of the ball line and the other pair substantially at the ends of the tip line, and that if a ball line gage, for example, engages the sole before the corresponding tip line gage the portion of the mask plate carrying these gages can turn upon its pivot 150 or 152, thus insuring the contact of both gages at that side of the shoe. Should both the gages at one side of the sole engage prior to the engagement of the two on the other side, the forepart of the sole then would be shifted laterally of the pad into central position and all the gages would come into contact with its edge face, and as soon as their movement was thereby interrupted further movement of the arm 140 would release the pawls 116, 117 for engagement with the fixed segment 114, thus locking all the gages against movement away from the sole.

It will also be apparent that the sole gages, upon engagement with the sole, locate the mask plate at a predetermined distance from the sole and do that irrespectively of the size of the sole. Usually the sole thus located will have activated cement thereon and a shoe B prepared for cement attachment to the sole will be placed upon the sole, its forepart being located relatively to the sole by the shoe gages 176, each of which is set relatively to its corresponding sole gage 172 to provide the required amount of extension of the sole beyond the upper or vice versa. At the iner end of the ball line the sole gage 172 may have to extend inwardly beyond the shoe gage 176, as indicated in the drawings.

It remains to locate the rear end of the shoe relatively to the rear end of the sole, and for this purpose mechanism shown in Figs. 11 and 12 is provided. The head 82 (Fig. 12) has at each side a rib 190 upon which is mounted a slide 192 which, of course, can move longitudinally of the shoe parallel to the slide 84. At one side of the slide 192 is pivoted at 194 a lever 196 and at the other side of the slide 192 is pivoted at 198 a lever 200. The levers 196, 200 are connected for equal and opposite movement by interconnected arms 202, 203 and their ends 204, 204, which extend toward the shoe, are brought into position to engage the sides of the rear portion of the shoe located upon the sole when the slide 192 has been moved toward the shoe until a gage 206 has made contact with the rear end of the shoe. The surfaces 204, 204 of the levers are normally held in separated position by a tension spring 208 connected between a rearward extension 210 of the lever 196 and a rearward extension 211 of the lever 200. Superposed on the lever 200, 211 and pivoted on the same pin 198 is a lever 212 one arm of which has a downturned lug 213 which is engaged by a compression spring 214 seated in the lever 200 and tending normally to hold the lever 212 turned in a clockwise direction relatively to the lever 200 as far as permitted by a downturned lug 216 on the other arm of the lever 212 and arranged to engage the rearward extension 211 of the lever 200. Counter-clockwise movement of the lever 212 relatively to the lever 200, 211 against the spring 214 is limited by a downturned lug 220 on the lever 212. The strength of the spring 214 is sufficient to overcome the spring 208 so that when the lever 212 is swung in a counterclockwise direction the spring 214 will overcome the spring 208 and cause the arms 196, 200 to approach each other. Therefore, if the slide 192 has been moved toward a shoe on the pad so that the gage 206 engages the rear end of the shoe, counterclockwise movement of the lever 212 will cause the arms 196, 200 to move equally and oppositely toward the shoe until one or the other of the surfaces 204 engages the shoe, whereupon that surface will move the shoe until the other surface 204 on the opposite lever engages the shoe and the shoe offers resistance to further closing of the arms. When this occurs, further movement of the lever 212 will compress the spring 214 and this movement is utilized to operate a locking pawl 222 pivoted at 224 on the arm 211 and having a tail 226 connected by a tension spring 228 and a pin 230 to the lever 212. When the lever 212 is turned counterclockwise relatively to the arm 211, the end of the lever 212 releases the tail of the pawl and allows it to engage teeth formed on a segment 232 fixed to the slide 192. When the lug 220 engages the arm 211, compression of the spring 214 ceases and further pressure may be applied to the two sides of the shoe by further force exerted on the lever 212. Conversely, clockwise movement of the lever 212 will allow the spring 214 to react, causing the end of the lever 212 to engage the tail of the pawl 222 and release the pawl, further movement of the lever allowing the spring 208 to separate the shoe-engaging surfaces 204, 204. Mechanism for moving the slide 192 toward the shoe and for operating the lever 212 can best be explained after other parts of the machine have been described.

Mechanism for engaging the shoe and applying preliminary pressure thereto will now be described. As shown in Fig. 1, to each of the brackets 34 is pivoted at 240 a pair of uprights 242, 243 connected at the top by a yoke 244. Extending between the uprights 242, 243 is a shaft 246 on which is pivoted a pair of levers 248, 249. The outer end of the lever 248 engages a vertically sliding member 250 which carries a toe rest 252. The outer end of the lever 249 engages a similar sliding member 251 carrying a rest 254 which is adapted to engage the cone of a last. The mounting and arrangement of the rests 252, 254 and the means for adjusting the toe rest longitudinally of the shoe by means of a handle 256 is preferably similar to that disclosed in the Ballard patent referred to above. The pad box 38 already described is secured at the outer end of an upper horizontal surface formed on the bracket 34 and the shoe and last engaging members or rests 252, 254 are movable radially of the turret from a position where they are not over the pad to a position over the pad by a swinging movement of the uprights 242, 243 about their pivot 240. This movement of the uprights is limited by a rod 258 pivoted at 260 to the upright 242 and arranged to slide loosely through a lug 262 on an upright bracket 264 mounted on the turret. Stops 266, 268 are provided on the rod 258 in spaced relation to limit respectively the inner and outer swinging movements of the upright 242 by engagement with the lug 262.

Referring again to Fig. 11, the means for operating the mechanism for positioning the rear end of the shoe will now be explained. The head 82 of the vertical slide 78 has a rearward extension 269 to which is pivoted at 271 a lever 273 the outer end of which is connected by a link 275 to the pivot 198 of the lever 208, 211, which, of course, is on the slide 192. A torsion spring 277 is wound about the pivot 271 with one end engaging the lever 273 and the other end engaging the extension 269 and tends to swing the lever 273 in a clockwise direction to move the slide 192 toward the shoe. The rearwardly extending arm of the lever 273 is connected by a chain 279 to the upright 243, the length of the chain being such that when the upright 243 is swung rearwardly the chain turns the lever 273 in a counterclockwise direction and withdraws the slide 192 away from the shoe against the tension of the spring 277. The end of the lever 212 which is next to the shoe has a hole which receives the downturned end of a rod 281 which extends rearwardly through a lug 283 connected by a vertical pivot to the upright 243. On the rod 281 is a spring 285 the outer end of which engages a collar 287 adjustably fixed on the rod 281. When the uprights 242, 243 are swung forwardly to locate the shoe-engaging devices 252, 254 over the shoe, the tension of the chain 279 will first be relieved to allow the spring 277 to move the slide 192 toward the shoe until the gage 206 engages the rear end of the shoe, whereupon the lug 283, which has meantime been sliding forwardly around the rod 281, will engage the spring 285 and, through the spring, will push on the lever 212, first causing the surfaces 204, 204 to be moved equally and oppositely toward the rear end of the shoe and to shift the shoe into central position with respect to the pin 92. Further pressure on the rod 281 will overcome the spring 214, thus releasing the pawl 222 for engagement with the teeth of the fixed rack 232 and locking the arms 196, 200 against separation. When the uprights 242, 243 are swung rearwardly, the mechanism for positioning the rear end of the shoe will be returned to its initial position, as already described and as shown in Fig. 11.

Referring now to Figs. 7, 8, 9 and 10, the bracket 264 carries mechanism for lifting the inner ends of the levers 248, 249 to apply preliminary pressure to the shoe and last when the shoe-engaging members 252, 254 are in operative position over the shoe and last. The bracket 264 has at its upper end two separated, forwardly extending fins 265, 267 in which are slots 269 to receive an equalizing lever 270, the lever being mounted to slide bodily up and down in the slots 269 and the ends of the lever having spherical surfaces 274 extending beyond the fins 265, 267 one of which engages the lever 248 and the other the lever 249. The lever 270 is prevented from endwise movement and is guided for vertical movement by a bolt 276 which extends through the lever and rearwardly to engage a vertical slot 278 in the bracket 264. The bolt 276 is also utilized to secure to the central portion of the lever 270 a block 280 which is slotted at 272 to receive the bolt 276 and underlies the lever 270. The lower surface of the block 280 is arcuate, its center of curvature being the center of the bolt 276, and the arcuate surface of the block is grooved at 282 to engage the cylindrical upper end of the upper part 284 of a telescopic toggle link the lower part of which is represented at 286. By loosening the bolt 276 the block 280 may be adjusted along the lever 270 to vary the relative ends of the two arms of the lever and hence to vary the pressure applied by the levers 248, 249 to the two ends of the shoe. The upper end of the member 284 is guided for vertical movement and held in proper relation to the groove 282 in the block 280 by rolls 288, 289 mounted on opposite ends of a shaft 290 passing through the upper end of the member 284, the rolls being movable vertically in the slots 269 in the fins 265, 267. Relative telescoping movement of the parts 284, 286 is limited by a screw 292 fixed in the member 286 and engaging a slot 294 formed in one side of the part 284. The two parts of the telescopic toggle link 284, 286 are held extended by compression springs 296, 297 partly seated in bores extending longitudinally of the part 286 and having their upper ends seated in lugs 298 projecting rearwardly from the part 284 at its upper end. The part 286 is pivoted at 300 to an arm 302 of an angle lever pivoted at 304, said lever having an arm 306 pivoted at 308 to a rod 310 guided for vertical longitudinal movement and arranged to be lifted when each toggle mechanism is located at the operating station by mechanism to be later described. The arm 302 forms, of course, the lower link of the toggle mechanism the upper link of which is telescopic and comprises the parts 284, 286. Pivoted at 312 to the toggle member 286 is an arm 314 which extends rearwardly through a slot 316 in the toggle member 284 (Fig. 10) and carries at its inner end a pair of levers 318, 319 which are pivoted thereto by a pin 320. One arm of each of the levers 318, 319 is formed with a toothed segment 322 the teeth of which engage rack teeth 324 formed on the inner face of the member 284. The levers 318, 319 curve downwardly and forwardly and have at their lower ends slots 326 each of which engages one end of a pin 328 fixed to a wedge 330. The wedge 330 has a lower cylindrical surface 332 engaging a complemental surface formed on the member 286 and has an inclined toothed surface 334 which underlies the lower end of the member 284 which is similarly inclined and is provided with similar teeth (Fig. 7). It will be seen that if the arm 314 is held from movement about its pivot 312 and the link 302 is moved in a direction to straighten the toggle, the relative contracting movement of the parts 284, 286 of the upper link of the toggle will cause the rack teeth 324 to act on the segments 322 and move the levers 318, 319 in a direction to withdraw the wedge 330, the parts being so proportioned that as the upper link 284, 286 is shortened against the pressure of the springs 296, 297 the toothed surface 334 of the wedge 330 will be withdrawn at a rate such that the teeth in the lower end of the part 284 will remain close to but will not engage the teeth 334 on the wedge. Under these conditions the rear ends of the levers 248, 249 will be lifted, and of course the shoe-engaging members 252, 254 will be pressed down with a force distributed between them and proportional to the combined resistance exerted by the springs 296, 297.

It is desirable, however, after the shoe-and-last-engaging members have been pressed against the shoe with a force sufficient firmly to seat the shoe upon the pad (such force being supplied by the springs 296, 297) positively to depress the shoe a predetermined amount to sink the shoe into the pad before the pad is inflated to apply the final pressure to the shoe bottom. It is also important, in order to secure uniform results, that each shoe, irrespective of its size, be sunk into the pad a predetermined distance. In the illustrated embodiment of the invention these results are obtained by the following mechanism. Pivoted on the pin 309 is an arm 336 carrying at its upper end a pin 338 which normally engages (Fig. 7) a bell-mouthed notch 340 formed in a plate 341 fixed to the arm 314. As long as the pin 338 remains in the notch 340 the mechanism will operate as above described. At a predetermined point, however, in the straightening movement of the toggle the pin is withdrawn by engagement of a stop screw 342 threaded into a downwardly extending portion 344 of the arm 336 with the lower link 302 of the toggle. When the screw 342 engages or is engaged by the link 302, the pin 338 will be withdrawn from the notch 340, causing movement of the wedge 330 to stop and allowing the teeth on the lower end of the member 284 to engage the teeth 334 on the wedge, whereupon the upper link 284, 286 of the toggle becomes a rigid compression element and further straightening movement of the toggle positively depresses the shoe-engaging members a predetermined amount, this amount being variable by adjusting the screw 342. When the toggle is broken, a projection 346 on the arm 336 engages the opposite side of the link 302 and the pin 338 is relocated in the bottom of the bell-mouthed notch 340, the bell mouth of the notch guiding the pin into the confined narrow portion of the slot which as parallel sides fitting the pin. During the latter portion of its straightening movement, the lower link 302 of the toggle engages a spring plunger 348 and compresses its spring 349, the movement of the toggle being carried beyond the position in which the pivot 300 is in vertical alinement with the pivots 299, 304 so that the final pressure, which is applied while upward pressure on the rod 310 is maintained, will hold the toggle against the pressure of the spring 349 which tends to break it. When the final pressure upon the shoe is relieved the spring 349 reacts to break the toggle and restore the parts to initial position.

The machine, of course, will be equipped with eight of the preliminary pressure mechanisms above described and, as the turret rotates, each of the rods 310 will be located in turn at the operating station in vertical alinement with a rod 350 (Figs. 1, 4 and 18) the lower end of which is pivoted at 352 to the rearwardly projecting arm 354 of a treadle lever fulcrumed at 356 to the base of the machine and having a forwardly projecting arm 358 carrying a treadle 360. The rod 350 is held normally depressed by a spring 362 (Fig. 1) the upper end of which engages the frame and the lower end of which engages a collar 364 fixed to the rod 350. By depression of the treadle 360 the rod 350 is raised to engage the lower end of the rod 310 and move it upwardly to operate the toggle mechanism for applying the preliminary pressure in the manner already described.

Figure 2:
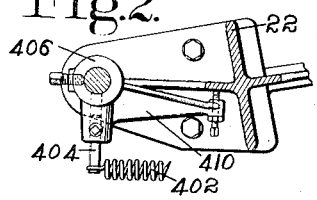
Figs. 2 and 3 are detail views of parts shown in Fig. 1.

The gage mechanism for relatively locating the forepart of the shoe and sole has been described as controlled by movement of the arm 140. This arm, as best shown in Fig. 1, is the vertical arm of a bell crank lever pivoted at 366 to the turret and having a horizontal arm 368. The arm 140 is normally held at the limit of its clockwise movement by the spring 139 (Fig. 11) in engagement with the frame. When the arm 140 is in this position a roll 372 on the arm 368 is so located that when the turret rotates it will engage and be lifted by a stationary cam 374 so that the gages will be released from the shoe as the shoe approaches the operating station. When at the operating station, however, the roll 372 passes off the cam 374 and rests on a ledge 376 (Fig. 4) extending laterally from a lever 378 pivoted near its left-hand end to the cam 374 at 380. The right-hand end of the lever 378 is pivoted at 382 to the upper end of a link 384 (Fig. 1) which, in turn, is pivoted at 386 to an arm 388 on an angle lever pivoted at 390 between ears 392 extending upwardly from the base and having a horizontal arm 394 connected by an adjustable link 396 to a treadle lever 398 carrying a treadle 400 located beside the treadle 360, the connection of the link 396 to the treadle lever 398 being a universal joint. The link 384 and the arm 388 constitute a toggle which is held in straightened position by a tension spring 402 connected at one end to a hook on the arm 388 and at the other end to a pin 404 carried by a casting 406 encircling an upright standard 408 and held from turning by an arm 410 carrying a screw arranged to engage a web on the frame 22 of the machine (Fig. 2). When the treadle 400 is depressed the toggle 384, 388 is broken and the right-hand end of the lever 378 moved downwardly to release the roll 372, thus permitting the arm 140 to move clockwise under the influence of the spring 139 and allow the forepart gages to operate in the manner already described.

Manually releasable means is provided in the machine disclosed in the Ballard et al. patent above referred to for holding the lever 378 in depressed position. As disclosed herein, there is pivoted at 412 to the machine frame a member 414 carrying a projecting plate 416 under which a similar plate 418 carried by the lever 378 is adapted to catch when the lever is depressed. The member 414 has a handle 420 by which it may be manually released and carries a tail 422 arranged to be engaged and the latch released when the turret rotates by a roll 424 mounted on the shaft 366. To prevent the lever 378 from snapping back too suddenly the roll 424 at the time of its engagement with the tail 422 is also in engagement with an inclined surface 426 formed on the lever 378, the roll as it travels along this surface allowing the lever 378 to be returned gradually to its normal position under the influence of the spring 402 acting on the toggle 384, 388.

Mechanism for supplying fluid, for example water, under pressure to inflate the hollow vessel or pad 68 will now be described. The hose 72 is connected by an elbow 430 to a valve casing 432 (Fig. 17) which is connected by a nipple 434 to the top portion of a cylinder 436. Within the cylinder is a piston 438 provided with a central threaded stud 440 on which a cupped washer 442 is placed. The cupped washer is clamped to the piston 438 by a metallic washer 444 having a thicker hub portion 446. Surrounding the hub portion 446 is a washer 448 of compressible material thicker than the heightwise extent of the hub portion 446 which is clamped against the washer 444 by a metallic washer 450 and a nut 452 threaded on the stud 440 fixed to the piston 438. Compression of the washer 448 by setting up the nut 452 causes the washer to expand and press the flange of the cupped washer 442 against the cylindrical wall. Secured by bolts 456 to the lower end of the cylinder 436 is a rod guide member 458 having a bushing 460 through which a piston rod 462 reciprocates.

In case liquid from the cylinder 436 should leak by the piston 438, it will be prevented from reaching the piston rod 462 by a peripheral groove 463 in the lower face of the piston. Liquid dropping from the groove may pass through an opening 465 and be caught by a groove 467 in a flange 469 on the lower part of the guide member 458. When the operator observes liquid in the groove 467, indicating that the piston is leaking, a plug 471 in the top of the cylinder may be removed and the nut 452 tightened with a screw-driver further to compress the washer 448, thus forcing the flange of the cupped washer 442 more tightly against the wall of the cylinder.

In the valve casing 432 is a check valve 464 carrying a washer 466 which is held in place by a screw 468 having a downwardly projecting stem 470. The valve 464 has an upwardly projecting stem 472 guided in a hole in a cap piece 474 held to the top of the casing by a ring 476 threaded to the casing 432. The washer 466 rests upon a valve seat 478. Beneath the stem 470 of the screw 468, and in vertical alinement therewith, is a rod 480 having its upper end cupped to engage the stem 470. The rod 480 is guided at its upper end in a member 482 secured to the casing 432 by a housing 484, in which housing the reduced lower end of the rod 480 is guided and is prevented from turning by a pin 486 in the rod and engaging a vertical groove in the housing 484. In the housing 484 is a washer 488 which abuts a shoulder between the larger upper portion of the rod 480 and the reduced lower portion and is secured fluid tight to the rod. Between the washer 488 and the member 482 is a metallic bellows 490 of the well-known sylphon type which is connected fluid tight both to the washer 488 and to the member 482. On the cylinder side the valve chamber of the casing 432 is connected to the inside of the bellows 490 by an orifice 492. This construction permits the rod 480 to be moved upwardly to unseat the valve 464, and the sylphon bellows acts as a spring to return the rod to normal position. The use of a packing gland with its attendant friction for the rod 480 is avoided and the construction is such that it remains permanently fluid tight. Fluid pressure in the valve chamber will, of course, be conducted by the orifice 492 into the bellows 490 which expands, moving the rod 480 downwardly until the washer 488 engages the inside of the housing 484 and leaves the valve 464 free to act as a check valve with reference to fluid moving from the cylinder 436 to the hose 72. Beneath the rod 480 is a rod 494 guided for vertical movement in bushed bearings 496, 497 formed on the cylinder 436 and having a head 498 underlying the rod 480. The rod 494 is larger than the rod 480 and provides a rugged construction for lifting the more delicate rod 480. It will be understood that a mechanism like that above described and illustrated in Fig. 17 is provided for each of the pad boxes.

By removing the plug 471 the system including the pad 68, the hose 72, the valve casing 432 and the cylinder 436 may be filled with fluid, for example water, care being taken to remove as much as possible of the air from the system and not to introduce enough liquid to cause any distention of the sole-engaging wall of the pad. It will be seen that by upward pressure on the piston rod 462 the water will be forced through the check valve 464 into the hose 72 and thence to the pad which will be distended or inflated to apply pressure to the shoe bottom, this pressure being maintained by the check valve 464 after upward pressure on the piston rod 462 is relieved and until the valve is unseated by upward movement of the rod 494 to lift the rod 480.

Mechanism for operating the piston rod 462 is best shown in Figs. 1 and 4 and comprises a Y-shaped lever 500 fulcrumed at the stem end by a pin 502 to the frame 22 and having the ends of the branches of the Y each pivoted at 504 to one of the vertically movable rods 505 of an electro-hydraulic unit 506 the base of which is pivoted at 508 to the base of the machine. When the motor of the electro-hydraulic unit 506 is energized, the rods 505 move upwardly, thus lifting the lever 500. Beneath the mid portion of the Y-lever 500 the frame 22 is provided with a vertical guideway 509 upon which a slide 510 is mounted, the upper portion of the slide 510 being located between the branches of the Y-lever 500 and having pivoted thereto at 512 a strut 514 which underlies each of the piston rods 462 in turn as they are brought into position at the operating station by rotation of the turret. The strut 514 is provided with an extension 516 which, when the strut is in vertical position, engages a face on the slide 510 and is held normally in such position by a torsion spring 518. At each side of the slide 510 a link 520 is connected between the slide and the adjacent branch of the Y-lever 500. It will now be seen that when the lever 500 is operated the slide 510 will move upwardly, causing the strut 514 to engage and operate the piston rod 462 to apply pressure to the pad at the operating station. Should the turret be rotated before the rods 505 of the electro-hydraulic unit return to normal position after operation of one of the piston rods 462, the rod 462 associated with the next unit to come into operating position might engage the strut 514. Hence the strut is made yielding by the pivot 512 and the spring 518, being thus able to tip over if engaged by one of the piston rods and being restored to upright position by the spring 518 when the rods 505 return to normal position, as illustrated in Fig. 1.

The electro-hydraulic unit 506 is preferably one of the commercial devices marketed under the name of "Thrustor Unit", one type of such device being disclosed in United States Letters Patent No. 1,902,480, granted March 21, 1933, on an application of William J. Woods. For the present purposes it is sufficient to explain that the electro-hydraulic unit 506 comprises a cylinder containing a piston connected to the rods 505 and a motor directly connected to a rotary pump which, when energized, forces liquid such as oil from above the piston to below the piston, thus moving the piston upwardly. To control the "Thrustor Unit" and avoid the application of too much pressure to the piston rods 462, a pressure control switch 522 (Fig. 4) is provided, the switch being of course in the motor circuit and being connected by a pipe 524 to the lower end of the cylinder of the "Thrustor Unit" so that when the pressure in the cylinder reaches a predetermined point the switch will be actuated to stop the motor. The switch is made adjustable so that it may be set to stop the motor at any desired predetermined pressure in the cylinder of the "Thrustor Unit" which is proportional to the pressure created by movement of the piston 433 in the pad.

Clearly it would be undesirable to permit the handle 36 to be operated to cause rotation of the turret during the operation of the "Thrustor Unit" to apply pressure to the shoe at the operating station since this would move the piston rod 462 away from the strut 514, with the result that full pressure would not be applied to the shoe. Accordingly, means is provided for insuring that the handle 36 will not be operated until after the motor of the "Thrustor Unit" has stopped and the pressure in the cylinder of the "Thrustor Unit" relieved. The pipe 524 which receives pressure from the cylinder of the "Thrustor Unit" is extended, as shown in Fig. 4, and connected to a casing 525 to which one end of a sylphon bellows 526 (Fig. 5) is secured by an air-tight joint. The other end of the sylphon bellows 526 is connected to a sliding rod 528 guided in another part of the casing 525 to engage a lever 530 pivoted at 532 to the casing and normally urged by a spring plunger 534 in a direction to compress the bellows 526. A stop screw 536 is provided on the lever which, upon expansion of the bellows 526, engages a fixed stop 538 on the casing 525. The lever 530 is connected at 540 to a rod 542 the other end of which is pivoted at 544 to an ear 546 (Fig. 19) on a plate 548 arranged to swing in a horizontal plane about a pivot 550 into and out of position under a stop screw 552 threaded through a lug on a casting 554 pivoted at 556 to the base of the machine and normally held by a spring 557 against a stop screw 559. The casting 554 is provided with a socket 558 for the handle 36, the socket being connected at 560 to a clutch trip rod 562. When the plate 548 is withdrawn from under the stop screw 552 the handle may be operated to rock the casting 554 in a counterclockwise direction, thus pulling on the rod 562 to cause operation of the clutch to rotate the turret. When the plate 548 is under the stop screw 552, however, the handle 36 cannot be operated to trip the clutch. While liquid in the cylinder of the "Thrustor Unit" is under substantial pressure, that pressure will be conducted through the pipe 524 to the bellows 526, which will therefore be expanded and the rod 528 will push against the lever 530, thereby actuating the rod 542 to hold the plate 548 under the stop screw 552 and prevent the clutch from being tripped, and, when the pressure is relieved, the spring plunger 534 will operate to move the plate 548 out of position under the stop screw 552 and permit the lever 36 to be operated to set the clutch.

It is desirable that the motor of the "Thrustor Unit" be under the control of the treadle 360 by which the toggle mechanism 284, 286, 302 is operated to apply preliminary pressure to the shoe. Accordingly, as shown in Fig. 18 the arm 354 of the treadle lever is provided with a projection 564 which, when the treadle has been depressed nearly to its limit, engages a screw 566 threaded through the short arm of a lever 568 having a fixed fulcrum at 570 and having at the end of its longer arm a button 572 arranged to engage a switch button 574 of a switch 576 connected in the circuit of the "Thrustor Unit" motor. By this arrangement the final portion of the movement of the treadle 360 by which preliminary pressure is applied to the shoe is utilized to close the switch 576 to cause the motor of the "Thrustor Unit" to be energized and power pressure to be applied to the shoe by forcing liquid into the pad 68.

In the normal operation of the machine, the treadle 400 will be depressed to bring the gages into operative position and will be held in depressed position by the latch plates 416, 418. It is desirable to prevent tripping of the clutch to rotate the turret until the treadle 400 has been thus depressed. Hence, as shown in Fig. 19, a slotted plate 578 is pivoted at 580 to the lower end of the socket 558 and has its lower end normally located over a ledge 582 on the base 20 of the machine. With the parts in the position shown, the counterclockwise movement of the handle 36 will be prevented by engagement of the lower end of the plate 578 with the ledge 582. The treadle lever 398 is provided with a pin or roll 584 which engages an angular slot 586 in the plate 578, the direction of the slot being such that upon depression of the treadle lever 398 the pin 584 will swing the plate 578 in a clockwise direction so that its end will clear the ledge 582 and as long as the treadle lever 398 is in that depressed position the handle 36 may be operated to set the clutch.

It is desirable that the pressure of the pad which is next to come to the operating station be relieved in conjunction with the operation of the treadle 400 to bring the gages into operative position at the operating station. Accordingly, the lever 378 (Fig. 1), the right-hand arm of which is depressed by operation of the treadle 400, is provided with a rearward extension 588 the end of which carries a screw located to press upwardly on the mid portion of a short lever 590 (Fig. 4) pivoted at 592 to a lug projecting from the stationary cam 374 and having its inner end located under one of the rods 494 by upward movement of which the check valve 464 is lifted to relieve pressure on the corresponding pad.

When the pressure is thus relieved upon the pad which is next to come to the operating station, the preliminary pressure toggle associated with the corresponding pad will be broken by the action of the spring plunger 348 (Fig. 7), allowing the rod 310 to drop. In order that the movement of the rod 310 and that of the connected parts may not be too violent, a member 594 (Figs. 1, 4 and 6) is provided which has a flat surface 596 located under the rod 310 of that preliminary pressure unit which is next to come to the operating station and of such a height that substantial breaking movement of the toggle cannot occur until the turret begins to rotate, whereupon the end of the rod 310 will slide down an inclined surface 598 on the member 594 and the rod will be lowered and the toggle broken gradually.

It may sometimes be desirable to rotate the turret when some or all of the pads are empty and hence when the rods 310 are down and in the path of the member 594. Accordingly, as shown in Fig. 6, the member 594 is pivoted at 600 to a fixed support 602 and is held yieldingly in operative position against a stop 604 on the support 602 by a torsion spring 606 wound about the pivot 600 and having one end engaging the support 602 and the other end engaging the member 594. The member 594 is provided with an inclined surface 608 (Fig. 4) which the rod 310 will engage if the rod is in lowered position and will swing the member 594 outwardly of the turret about its pivot 600 against the spring 606 and thus permit rotation of the turret without injury to the machine.

Figure 3:
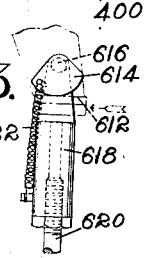

Since the upward pressure of the "Thrustor Unit" 506 upon the pistons 462 is applied at some distance from the center of the turret, considerable strain is put upon that radial arm of the turret upon which the "Thrustor Unit" is operating. To assist in withstanding this pressure the mechanism shown in Figs. 1 and 3 is provided. Each bracket 34 of the turret is provided with a downward extension 610 having a horizontal ledge 612 which, when pressure is to be applied by the "Thrustor Unit" to that arm, moves under a cam 614 pivoted at 616 to a member 618 fixed to the upper end of a vertical support 620 secured to the base of the machine. The face of the cam 614 which engages the ledge 612 is spiral, that is, the elements of its surface are at successively greater distances from its center 616, and a tension spring 622 is connected between the cam and the support 618 to hold the cam turned so that the portion having the greater radius is held toward the ledge 612. When the turret rotates, the ledge 612 approaches the cam in the direction of the arrow in Fig. 3 and as it engages the cam the cam will turn as much as necessary to present to the ledge the portion of the cam having the proper radius to prevent upward movement of the ledge, without, however, interfering with movement of the ledge in the same direction from under the cam when the turret is again rotated.

Having thus described my invention, what I claim as new and desire to secure by Letters Patent of the United States is:

1. In a machine for applying pressure to shoe bottoms, the combination of an inflatable pad constructed and arranged when deflated to support yieldingly the central portion only of the sole of a shoe, means for depressing a shoe and sole into the pad a predetermined amount irrespectively of the size of the shoe, and means for inflating the pad.

2. In a machine for applying pressure to shoe bottoms, the combination of an inflatable pad having a solid central portion acting when the pad is deflated yieldingly to support the central portion only of the sole of a shoe, means for depressing a shoe and sole into the pad a predetermined amount irrespectively of the size of the last, and means for thereafter inflating the pad.

3. In a machine for applying pressure to shoe bottoms, the combination of an inflatable pad having a solid yielding column located under the central portion of the forepart of a shoe operatively positioned upon the pad, means for engaging a shoe on the pad, means for depressing said engaging means positively a predetermined amount to cause pressure to be applied to the central portion of the forepart, and means for inflating the pad to apply pressure to the periphery of the forepart.

4. In a machine for applying pressure to shoe bottoms, the combination of a yielding pad, means for engaging a shoe placed upon the pad, and means for relatively moving the pad and the shoe-engaging means positively a predetermined amount to sink the shoe into the pad always to the same level irrespectively of the size of the shoe.

5. In a machine for applying pressure to shoe bottoms, the combination of a yielding pad, means for engaging a shoe and its last placed upon the pad, and means for operating the shoe and last-engaging means first to engage the shoe and last with light pressure and then positively to sink the shoe and last into the pad a predetermined amount irrespectively of the size of the last and shoe.

6. In a machine for applying pressure to shoe bottoms, the combination of a yielding inflatable pad, means for engaging a shoe and its last placed upon the pad, means for operating the shoe and last-engaging means first to engage the shoe and last with light pressure and then positively to sink the shoe and last into the pad a predetermined amount irrespectively of the size of the last and shoe, and means for inflating the pad.

7. In a machine for applying pressure to shoe bottoms, the combination of a hollow pad having a solid rubber portion under the central portion of the forepart of a shoe, means for engaging a shoe and its last placed upon the pad, means for operating the shoe-and-last-engaging means first to engage the shoe and last with light pressure and then positively to sink the shoe and last into the pad against the resistance of said rubber portion a predetermined amount irrespectively of the size of the last and shoe, and means for inflating the pad to apply pressure to the marginal portion of the sole.

8. In a machine for applying pressure to shoe bottoms, the combination of a yielding pad, means for engaging a shoe and its last placed upon the pad, means for operating said shoe-and-last-engaging means comprising a toggle having a yieldingly compressible link, means for straightening the toggle to cause light pressure to be applied to the shoe through the compressible link, and means operating at a predetermined point in the straightening movement of the toggle to lock the compressible link against further compression, completion of said straightening movement acting to depress the last a predetermined amount.

9. In a machine for applying pressure to shoe bottoms, the combination of a yielding pad, means for engaging a shoe and its last placed upon the pad, means for operating said shoe-and-last-engaging means comprising a toggle having a link composed of relatively slidable elements, a wedge supported by one element with its edge adjacent to the other element, means acting during the initial portion of the straightening movement of the toggle to move the wedge so as not to interfere with the relative movement of said elements, and means for arresting movement of the wedge when the toggle is at a point a predetermined distance from its straightened position to render the subsequent action of the toggle positive.

10. In a machine for applying pressure to shoe bottoms, the combination of a yielding pad, means for engaging a shoe placed upon the pad, means for relatively operating said pad and shoe-engaging means comprising a toggle having a yieldingly contractible link, means for straightening the toggle to cause light pressure to be applied through the contractible link, and means operating at a predetermined point in the straightening movement of the toggle to lock the contractible link against further contraction, completion of said straightening movement acting to effect a predetermined amount of relative movement of the shoe and pad.

11. In a machine for applying pressure to shoe bottoms, the combination of a yielding pad, means for engaging a shoe placed upon the pad, means for relatively operating said pad and shoe-engaging means comprising a toggle having a link composed of relatively slidable elements, a wedge supported by one element with its edge adjacent to an end of the other element, means acting during initial straightening movement of the toggle to move the wedge so as not to interfere with relative movement of said elements in a direction to shorten the link, and means acting when the toggle is at a predetermined distance from its straightened position to arrest movement of the wedge to prevent further shortening of the link.

12. In a machine for applying pressure to shoe bottoms, the combination of a yielding pad, means for engaging a shoe and its last placed upon the pad, means for operating said shoe-and-last-engaging means comprising a toggle having a yieldingly extended link, means for straightening the toggle to cause light pressure to be applied to the shoe through the link during the initial portion of said movement to shorten the link, and means operating at a predetermined point in the straightening movement of the toggle to prevent shortening of the link, completion of said straightening movement acting to depress the last a predetermined amount.

13. In a machine for applying pressure to shoe bottoms, the combination of a yielding pad, means for engaging a shoe and its last placed upon the pad, means for relatively moving the pad and said shoe-and-last-engaging means to sink the shoe in the pad comprising a toggle having a link composed of relatively slidable elements, a wedge supported by one element with its edge adjacent to the other element, means acting during the initial straightening movement of the toggle to move the wedge so as not to interfere with the relative movement of said elements, and means acting during the straightening movement of the toggle at a point which is at a predetermined distance from its straightened position to arrest movement of the wedge to prevent further relative movement of said elements thereby rendering the subsequent action of the toggle positive.

14. In a machine for applying pressure to shoe bottoms, the combination of an inflatable pad, means including a toggle for pressing a shoe upon the pad, a stop for arresting the toggle in a position slightly beyond its straight position, a spring tending normally to break the toggle, and means for inflating the pad to hold the toggle when positioned against the stop and prevent its being broken by the action of said spring, deflation of the pad allowing the spring to break the toggle and release the shoe.

15. In a machine for applying pressure to shoe bottoms, the combination of a movable carrier, a plurality of inflatable pads on the carrier, means for applying pressure to a shoe on each of the pads comprising a manually operated toggle, means for inflating the pads, said inflation acting to hold the toggle in straightened position, means operating in a subsequent position of each pad to exhaust the pad, and means operated by movement of the carrier for gradually returning the toggle to broken position.

16. In a machine for applying pressure to shoe bottoms, the combination of an inflatable pad, means including a toggle for pressing a shoe upon the pad, a stop for arresting the toggle in a position slightly beyond its straight position, a spring tending normally to break the toggle, means for inflating the pad to hold the toggle when positioned against the stop and prevent its being broken by the action of said spring, deflation of the pad allowing the spring to break the toggle and release the shoe, and means to prevent too sudden breaking movement of the toggle.

17. In a machine for applying pressure to shoe bottoms, the combination of a movable carrier, a plurality of inflatable pads on the carrier, means for applying pressure to a shoe on each of the pads comprising a manually operated toggle which can move just beyond its straight position, means for inflating the pads, said inflation acting to hold the toggle in said position, means operating in a subsequent position of each pad to exhaust the pad, and means for breaking the toggle.

18. In a machine for applying pressure to shoe bottoms, the combination of a plurality of inflatable pads to receive shoes, a cylinder and piston for each of the pads, and an electro-hydraulic unit arranged to cause movement of the pistons in turn to inflate the pads.

19. In a machine for applying pressure to shoe bottoms, the combination of an inflatable pad, a cylinder and piston connected therewith, and an electro-hydraulic unit constructed and arranged to cause pressure-applying movement of the piston thereby inflating the pad.

20. In a machine for applying pressure to shoe bottoms, the combination of a movable carrier, a plurality of inflatable pads on the carrier, a cylinder and piston connected with each of the pads for inflating the same, a lever located adjacent to an operating station for operating the pistons in turn as they come to that station, and power means for rocking the lever to operate the pistons.

21. In a machine for applying pressure to shoe bottoms, the combination of a plurality of inflatable pads, a cylinder and piston connected with each pad for inflating the same, means for presenting the pads in turn at an operating station, and an electro-hydraulic unit arranged to cause pressure-applying movement of the piston connected to the pad at the operating station.

22. In a machine for applying pressure to shoe bottoms, a pad to receive a shoe, an abutment arranged in opposition to the pad to contact with the shoe on the pad, and an electro-hydraulic unit arranged to cause relative movement of said abutment and the shoe-engaging portion of the pad thereby to apply pressure to the shoe bottom.

23. In a machine for applying pressure to shoe bottoms, the combination of a rotatable turret, a plurality of inflatable pads on the turret, a cylinder and piston connected with each pad for inflating the same, and electro-hydraulic means located at one station of the turret for operating the pistons in turn as they come to that station.

24. In a machine for applying pressure to shoe bottoms, the combination of an inflatable pad, means for holding a shoe upon the pad, electro-hydraulic means for causing inflation of the pad, and a switch controlled in accordance with pressure applied to the shoe for stopping the electro-hydraulic means.

25. In a machine for applying pressure to shoe bottoms, the combination of an inflatable pad, means for holding a shoe upon the pad, electro-hydraulic means for causing inflation of the pad, and a switch constructed and arranged to be opened by pressure created in the electro-hydraulic means to stop said means.

26. In a machine for applying pressure to shoe bottoms, the combination of an inflatable pad, means for holding a shoe upon the pad, means for inflating the pad, electro-hydraulic means including a motor-driven pump, said pump operating the means for inflating the pad, and a switch for said motor controlled in accordance with pressure applied by said pump for stopping the motor.

27. In a machine for applying pressure to shoe bottoms, the combination of an inflatable pad, means for holding a shoe on the pad, a cylinder connected with the pad, a piston in said cylinder arranged when operated to force fluid into the pad, an electro-hydraulic unit for operating said piston, and a switch controlled by the fluid pressure in said electro-hydraulic unit for stopping the unit.

28. In a machine for applying pressure to shoe bottoms, the combination of an inflatable pad, means for holding a shoe on the pad, a cylinder connected with the pad, a piston in said cylinder arranged when operated to force fluid into the pad, an electro-hydraulic unit for operating said piston, and a switch controlled by the fluid pressure in said electro-hydraulic unit for stopping the unit when a predetermined pressure has been applied by the unit.

29. In a machine for applying pressure to shoe bottoms, the combination of an inflatable pad, means for holding a shoe on the pad, a cylinder connected with the pad, a piston in said cylinder arranged when operated to force fluid into the pad, an electro-hydraulic unit for operating said piston, a switch controlling said electro-hydraulic unit, and means operated by the pressure created by said unit for stopping the unit.

30. In a machine for applying pressure to shoe bottoms, the combination of a rotatable turret, a plurality of inflatable pads on the turret, a cylinder and piston connected with each pad for inflating the same, and a lever located at one station of the turret for operating the pistons in turn as they come to that station.

31. In a machine for applying pressure to shoe bottoms, the combination of a rotatable turret, a plurality of inflatable pads on the turret, a cylinder and piston connected with each pad for inflating the same, electro-hydraulic means located at one station of the turret for operating the pistons in turn as they come to that station, and means to prevent rotation of the turret while the electro-hydraulic means is operating.

32. In a machine for applying pressure to shoe bottoms, the combination of a rotatable turret, a plurality of inflatable pads on the turret, a cylinder and piston connected with each pad for inflating the same, electro-hydraulic means located at one station of the turret for operating the pistons in turn as they come to that station, and means operated by the fluid pressure in the electro-hydraulic means to prevent rotation of the turret while the electro-hydraulic means is operating.

33. In a machine for applying pressure to shoe bottoms, the combination of a turret, a plurality of inflatable pads on the turret, means for supporting a shoe on each of the pads, means acting by an upward thrust on the turret at a substantial distance from its center for causing inflation of each pad as it comes into working position, and auxiliary means for opposing the upward thrust on the turret at the station where the upward thrust is applied.

34. In a machine for applying pressure to shoe bottoms, the combination of a turret, a plurality of inflatable pads on the turret, means for supporting a shoe on each of the pads, means acting by an upward thrust on the turret at a substantial distance from its center for causing inflation of each pad as it comes to an operating station, a ledge on the outer periphery of the turret, and a support independent of rotation of the turret to engage the ledge at said station to take the upward thrust on the turret.

35. In a machine for applying pressure to shoe bottoms, the combination of a turret, a plurality of inflatable pads on the turret, means for supporting a shoe on each of the pads, means acting by an upward thrust on the turret at a substantial distance from its center for causing inflation of each pad as it comes into working position, and means comprising an independently supported spiral cam engaging the outer periphery of the turret for opposing the upward thrust on the turret at the station where the upward thrust is applied.

36. A pad box for use in applying pressure to shoe bottoms provided with a sole-receiving pad, a mask plate mounted for movement laterally of the pad, sole gages carried by the mask plate and extending inwardly of the pad beyond the edge of the mask plate, and means constructed and arranged to permit heightwise movement of the gages relatively to the mask plate so that they may remain in contact with the surface of the pad notwithstanding change in contour of the pad due to the applied pressure.

37. A pad box for use in applying pressure to shoe bottoms provided with a sole-receiving pad, mask plates mounted for movement laterally only of the pad, and shoe gages carried by the mask plates.

38. A pad box for use in applying pressure to shoe bottoms provided with a sole-receiving pad, mask plates mounted for movement laterally only of the pad, and sole and shoe gages carried by the mask plates.

39. A pad box for use in applying pressure to shoe bottoms provided with a sole-receiving pad, mask plates overlying the forepart of the pad and movable to expose more or less of the area of the forepart of the pad, constantly acting means for closing the mask plates toward the sole, and means controlled by the size of the sole for determining the positions of the mask plates.

40. A pad box for use in applying pressure to shoe bottoms provided with a sole-receiving pad, mask plates overlying the forepart of the pad and movable to expose more or less of the area of the forepart of the pad, means constantly acting to move the mask plates inwardly of the pad, and means carried by the mask plates to engage a sole on the pad and determine the positions of the mask plates relatively thereto.

41. A pad box for use in applying pressure to shoe bottoms provided with a sole-receiving pad, mask plates overlying an end portion of the pad and movable toward and from each other to expose more or less of the area of the end portion of the pad, and means extending inwardly beyond the edges of the mask plates for engaging a sole on the pad and for positioning the mask plates in spaced relation from the sole.

42. A pad box for use in applying pressure to shoe bottoms provided with a sole-receiving pad, a pair of overlapping mask plates mounted upon the box, means for closing the mask plates toward a shoe on the pad, and sole and shoe gages carried by the mask plates, said sole gages having capacity for heightwise movement to maintain them in contact with the pad.

43. A pad box for use in applying pressure to shoe bottoms provided with a sole-receiving pad, a pair of mask plates mounted upon the box, means for closing the mask plates toward a shoe on the pad, and automatic means for opening the mask plates.

44. A pad box for use in applying pressure to shoe bottoms provided with a sole-receiving pad, a pair of mask plates mounted upon the box, spring means for closing the mask plates toward a shoe on the pad, and manually operated means for controlling the action of said spring means.

45. A pad box for use in applying pressure to shoe bottoms provided with a sole-receiving pad, a pair of mask plates each having a thin portion and a thick portion, said plates being arranged with the thin portion of one overlapping the thin portion of the other, and means for equally and oppositely adjusting the plates relatively to each other laterally of the pad.

46. A pad box for use in applying pressure to shoe bottoms provided with a sole-receiving pad, and a pair of mask plates each having a portion at its toe end thinner than the remaining portion, said plates being arranged with their thinner portions overlapping and for movement toward and from each other.

47. A pad box for use in applying pressure to shoe bottoms provided with a sole-receiving pad, a pair of mask plates embracing the forepart of a sole on the pad each having a thin portion at its outer end, said plates being arranged with their thin portions overlapping, and means for effecting equal and opposite closing movement of the plates relatively to each other.

48. A pad box for use in applying pressure to shoe bottoms provided with a sole-receiving pad, a pair of mask plates mounted on the box for movement toward and from a shoe mounted on the pad, sole gages carried by the mask plates and extending inwardly from the inner edges of the mask plates, the work-engaging faces of the gages being thus spaced inwardly of the edge of the mask plates and acting when they engage the sole to locate the inner edges of the plates at a predetermined substantial distance from the sole edge, and shoe gages mounted upon said sole gages in predetermined relation thereto laterally of the shoe.

49. A pad box for use in applying pressure to shoe bottoms provided with a sole-receiving pad, a pair of mask plates mounted on the box for movement toward a shoe mounted on the pad, means tending constantly to move the mask plates toward each other, and sole gages carried by the mask plates in spaced relation from their edges and acting when they engage the sole to locate the inner edges of the plates in such spaced relation from the sole edge.

50. A pad box for use in applying pressure to shoe bottoms provided with a sole-receiving pad, a pair of mask plates substantially fixed as to movement longitudinally of the pad and mounted on the box for equal and opposite movement toward a shoe mounted on the pad, and sole gages carried by the mask plates and acting when they engage the sole to locate the inner edges of the plates at a predetermined distance from the sole edge.

51. A pad box for use in applying pressure to shoe bottoms provided with a sole-receiving pad, a pair of mask plates substantially fixed as to movement longitudinally of the pad and mounted on the box for equal and opposite movement toward a shoe mounted on the pad, sole gages carried by the mask plates and acting when they engage the sole to locate the inner edges of the plates at a predetermined distance from the sole edge, and automatic means for locking the mask plates against separation to hold the sole gages against the sole.

52. In a cement sole-attaching machine, the combination of a pad, sole-engaging members substantially fixed as to movement longitudinally of the pad and movable laterally of the pad to engage the edge face of a sole located on the pad, and masking members arranged to move with said sole-engaging members.

53. In a cement sole-attaching machine, the combination of a pad, sole-engaging members substantially fixed as to movement longitudinally of the pad and movable laterally of the pad to engage the edge face of a sole located on the pad, and masking members constructed and arranged to maintain a predetermined spaced relation with respect to the edge of a sole located by said sole-engaging members.

54. In a cement sole-attaching machine, the combination of a pad, sole-engaging members movable laterally only of the pad to engage the edge face of a sole located on the pad, and masking members connected to said sole-engaging members so that the masking members are located at a predetermined distance from the sole when the sole-engaging members engage the sole.

55. In a cement sole-attaching machine, the combination of a pad, sole-engaging members substantially fixed as to movement longitudinally of the pad and movable laterally of the pad to engage the edge face of a sole located on the pad, and masking members connected to said sole-engaging members so as to be located a predetermined distance from the sole when the sole-engaging members engage the sole.

56. In a cement sole-attaching machine, the combination of a pad, a pair of masking members oppositely movable laterally of the pad, a pair of sole gages on each of said masking members, said gages being arranged to engage the edge face of the forepart of a sole located on the pad, means tending constantly to urge said masking members toward a sole on the pad, and means for retracting the masking members and gages to permit a sole to be placed between them.

57. In a cement sole-attaching machine, the combination of a pad, a pair of masking members equally and oppositely movable laterally of the pad, a pair of sole gages and a pair of shoe gages on each of said masking members, said sole gages being arranged to engage the edge face of the forepart of a sole located on the pad, means tending to urge said masking members toward a sole on the pad, and means for retracting the masking members and gages to permit a sole to be placed between them and allowing the gages to engage the edge face of the sole, said shoe gages being then positioned to receive a shoe corresponding to said sole.

58. In a cement sole-attaching machine, the combination of a pad, a pair of masking members arranged to extend along the sides of the forepart and to overlap at the toe end of the pad, the overlapping portions being movable relatively to each other to permit the side portions to be moved toward and from a sole on the pad, means tending constantly to urge said masking members toward a sole on the pad, and means for retracting the members to permit a sole to be placed between them.

59. In a cement sole-attaching machine, the combination of a pad, a pair of masking members arranged to extend along the sides of the forepart and to overlap at the toe end, said members being movable bodily relatively to each other to permit the side portions to be moved toward and from a sole on the pad and also movable about vertical axes located one at each side of the forepart, means tending to urge said masking members toward a sole on the pad, and means for retracting the members to permit a sole to be placed between them.

60. In a cement sole-attaching machine, the combination of a pad, masking members extending about the forepart of the pad and movable laterally of the pad toward and from the edge face of the forepart of a sole located on the pad, means tending to urge the masking members toward a sole on the pad, automatic means for opening the masking members to permit a sole to be placed between them, and operator-controlled means for permitting movement of the members from opposite directions toward the sole.

61. In a cement sole-attaching machine, the combination of a pad, masking members extending about the forepart of the pad and movable laterally of the pad toward and from the edge face of the forepart of a sole located on the pad, a pair of sole gages carried by each of the masking members, means tending to urge the masking members toward a sole on the pad, automatic means for spreading the masking members to permit a sole to be placed between them, and operator-controlled means for permitting movement of the members from opposite directions toward the sole.

62. In a cement sole-attaching machine, the combination of a pad, masking members for the forepart of the pad, means for constantly urging the masking members equally and oppositely toward a sole on the pad, and means for locating the masking members at a predetermined distance from the sole irrespectively of the size of the sole.

63. In a cement sole-attaching machine, the combination of a pad, a pair of mask plates extending along the sides of the forepart of the pad and having overlapping portions which extend about the toe portion of the pad, and means for adjusting the mask plates toward and from each other laterally of the pad without substantial movement longitudinally thereof to cause them to conform to the foreparts of shoes of various sizes.

64. In a cement sole-attaching machine, the combination of a pad, a pair of mask plates extending along the sides of the forepart of the pad and having overlapping portions which extend about the toe portion of the pad, a pair of arms arranged for equal and opposite movement transversely of the forepart of the pad, one of the mask plates being pivoted midway of its length to each of the arms, means for normally moving the arms toward each other, and operator-controlled means for separating the arms.

65. In a cement sole-attaching machine, the combination of a pad, arms arranged for equal and opposite swinging movement laterally of the pad, masking members pivoted to the ends of said arms, said members extending along the sides of the forepart of the pad and overlapping at the toe end of the pad, means tending normally to move the arms toward each other, a pair of gages mounted on each masking member, the gages of each pair being on opposite sides of the pivot of the masking members, means for automatically spreading the arms to separate the masking members for introduction of a sole, and operator-controlled means for permitting the masking members to close upon the sole and the gages to engage the edge face of the sole.

66. In a cement sole-attaching machine, the combination of a pad box, a pad in the box, two pairs of sole engaging members, each pair arranged to engage the edge face of one side of a sole located on the pad, shoe gages carried by said sole-engaging members, a single ratchet-and-pawl means for locking all the sole-engaging members against movement away from the sole, and means for pressing the shoe and sole together.

67. In a cement sole-attaching machine, the combination of a pad box, a pad in the box, a pair of sole gages at each side of the pad arranged for movement over the surface of the pad to engage the edge face of a sole located on the pad, shoe gages carried by said sole gages, means for moving said pairs of sole gages in unison toward and from the sole, a single ratchet-and-pawl means for locking both pairs of the gages against movement away from the sole, and means acting to unlock said ratchet-and-pawl means when the sole gages are to be moved away from the sole.

68. In a machine for cement sole-attaching, the combination of a pad, a shoe-engaging abutment movable into position over the pad from that side of the pad which is remote from the operator, means for operating the shoe abutment to press a shoe upon the pad, a pair of shoe-locating members movable longitudinally of the pad and movable equally and oppositely toward and from each other to engage the rear portion of a shoe upon the pad, and connections between the shoe-locating members and the shoe-engaging abutment for causing the locating members to move longitudinally of the pad and to close upon opposite sides of the rear portion of the shoe when the shoe abutment is moved into position over the pad.

69. In a cement sole-attaching machine, the combination of a pad, a shoe-engaging abutment movable into position over the pad, shoe-locating means arranged to move laterally of the pad to engage a shoe, and means controlled by movement of the shoe-engaging abutment into operative position over the shoe for causing the shoe-locating means to move laterally of the shoe.

70. In a cement sole-attaching machine, the combination of a pad, a shoe-engaging abutment movable into position over the pad, shoe-locating means arranged to move longitudinally and laterally of the pad into shoe-engaging position, and means controlled by movement of the shoe-engaging abutment into operative position over the shoe for causing the shoe-locating means to move longitudinally and laterally of the shoe.

71. In a cement sole-attaching machine, the combination of a pad, a shoe-engaging abutment movable into and out of position over the pad, means for locating relatively the forepart of a shoe and the forepart of a sole on the pad, means engaging the rear part of the sole for locating it centrally of the pad, a pair of members movable toward and from each other to engage opposite sides of the rear part of a shoe, and means operated in conjunction with movement of the shoe abutment over the pad to cause said members to move equally and oppositely toward each other to locate the rear end of the shoe with respect to the rear end of the sole.

72. In a cement sole-attaching machine, the combination of a pad, a shoe-engaging abutment movable into and out of position over the pad, means for locating relatively the forepart of a shoe and the forepart of a sole on the pad, means for engaging the rear part of a sole irrespectively of its length and for locating it laterally centrally of the pad, a pair of members movable longitudinally of the pad and movable toward and from each other to engage opposite sides of the rear part of a shoe, and means operated in conjunction with movement of the shoe abutment over the pad to cause said members to move longitudinally of the pad toward the shoe and to move equally and oppositely toward each other to locate the rear end of the shoe with respect to the rear end of the sole.

73. In a cement sole-attaching machine, the combination of a pad, masking plates substantially fixed as to movement longitudinally of the pad and movable bodily laterally of the pad toward and from the edge face of the forepart of a sole located on the pad, said plates being each reduced in thickness at one end and with their thinner portions overlapping at the toe end of the pad, their inner edges conforming substantially to the shape of the forepart of a sole.

74. In a cement sole-attaching machine, the combination of a pad, a pair of masking members oppositely movable laterally of the pad, a pair of sole gages and a pair of shoe gages on each of said masking members, said sole gages being arranged to engage the edge face of the forepart of a sole located on the pad, means tending to urge said masking members and gages toward a sole on the pad, and means for retracting the masking members and sole and shoe gages to permit a sole to be placed between them.

75. In a cement sole-attaching machine, the combination of a pad, a masking member arranged to extend along the side of the forepart and to be moved toward and from a sole on the pad, means tending constantly to urge said masking member toward a sole on the pad, and means for retracting the member to permit a sole to be placed on the pad.

76. In a cement sole-attaching machine, the combination of a pad, a masking member extending about the forepart of the pad and movable toward and from the edge face of the forepart of a sole located on the pad, a sole gage carried by the masking member, means tending to urge the masking member toward a sole on the pad, automatic means for retracting the masking member to permit a sole to be placed on the pad, and operator-controlled means for causing movement of the member toward the sole.

77. In a machine for cement-attaching soles to shoes, the combination of a pad box provided with a sole receiving pad, a carrier mounted on the box for movement along the longitudinal median line of the box, means on the carrier for locating the heel end of a sole placed on the pad, and a plate mounted on the carrier and arranged to extend under the heel end of the sole so located.

78. In a machine for cement-attaching soles to shoes, the combination of a turret, a plurality of inflatable pads on the turret, a set of sole and shoe locating mechanisms for each of the pads, manually operated means for bringing each set of locating mechanisms into operative position as it is brought by rotation of the turret to an operating station, means for causing inflation of the pad at the operating station, and means operated by said manually operated means for exhausting the pad next to come to the operating station.

79. In a machine for cement-attaching soles to shoes, the combination of a pad box provided with a sole-receiving pad, a pin carrier mounted on the box for movement along the longitudinal median line of the box, a pin on the carrier for engaging a hole in the heel end of a sole located on the pad, and a plate mounted on the carrier and arranged to extend under the heel end of the sole located by said pin.

80. In a machine for cement-attaching soles to shoes, the combination of a turret, a plurality of inflatable pads on the turret, a set of sole and shoe locating mechanisms for each of the pads, means for controlling the operation of each set of locating mechanisms as it is brought by rotation of the turret to an operating station, means for causing inflation of the pad at the operating station, and means operated by the means which controls the operation of the set of locating mechanisms at the operating station for exhausting the pad next to come to the operating station.

81. In a cement sole-attaching machine, the combination of a pad, masking members for the forepart of the pad, means for moving the masking members equally and oppositely toward and from a sole on the pad, means for locating the masking members at a predetermined distance from the sole irrespectively of the size of the sole, means comprising a straightened toggle for holding the masking members away from the sole, and manually operated means for breaking the toggle to allow the masking members to approach the sole.

82. In a cement sole-attaching machine, the combination of a frame, a pad in the frame, arms pivoted on the frame and connected for equal and opposite swinging movement laterally of the pad, masking members pivoted to the ends of said arms, said members extending along the sides of the forepart of the pad and overlapping at the toe end of the pad, means tending normally to move the arms toward each other, a pair of gages mounted on each masking member, the gages of each pair being on opposite sides of the pivot of the masking members, means for automatically spreading the arms to separate the masking members for introduction of a sole, operator-controlled means for permitting the masking members to close upon the sole, a pawl mounted on the frame, a ratchet plate carried by one of the arms, and means carried by the other arm for controlling the ratchet to lock the arms against separation and to unlock them.

83. In a cement sole-attaching machine, the combination of a pad box, a pad in the box, members arranged to engage the edge face of a sole located on the pad, shoe gages carried by said sole-engaging members, ratchet-and-pawl means for locking the sole-engaging members against movement away from the sole, means for pressing the shoe and sole together, and automatic means for releasing the pawl and moving the members away from the sole.

84. In a cement sole-attaching machine, the combination of a pad box, a pad in the box, sole gages arranged for movement over the surface of the pad to engage the edge face of a sole located on the pad, shoe gages carried by said sole gages, means for moving the sole gages toward and from the sole, ratchet-and-pawl means for locking the gages against movement away from the sole, and means to move the sole-engaging members away from the sole, said means acting first to unlock said ratchet-and-pawl means.

85. In a machine for cement sole-attaching, the combination of a pad, a shoe-engaging abutment movable into position over the pad from that side of the pad which is remote from the operator, means for operating the shoe abutment to press a shoe upon the pad, means for locating the rear end of a sole centrally of the pad, a pair of shoe-locating members movable longitudinally of the pad and movable equally and oppositely toward and from each other to engage the rear portion of a shoe upon the pad, and connections between the shoe-locating members and the shoe-engaging abutment for causing the locating members to move longitudinally of the pad and to close upon opposite sides of the rear portion of the shoe and locate it relatively to the sole when the shoe abutment is moved into position over the pad.

86. In a machine for cement-attaching soles to shoes, the combination of a pad, a pad box therefor, a support mounted on the pad box for movement heightwise of the pad, sole-engaging means mounted on said support for movement in the direction of the longitudinal median line of the pad, and shoe-engaging fingers also mounted on said support for movement parallel to said median line independently of the sole-engaging means and for equal and opposite movement transversely of said line.

87. In a cement sole-attaching machine, the combination of a pad, sole-engaging means arranged for movement longitudinally of a sole on the pad, shoe-positioning means comprising a pair of fingers mounted for movement longitudinally of the shoe and for equal and opposite movement only relatively to the median line of the pad toward and from the shoe, and means operating without special attention on the part of the operator for moving the fingers longitudinally of the shoe and closing them equally and oppositely upon the shoe.

88. In a machine for cement-attaching soles to shoes, the combination of a pad, sole-engaging means mounted for movement only in the longitudinal median plane of the pad, and shoe-engaging fingers mounted for movement parallel to said plane and confined to equal and opposite movement transversely with respect to said plane.

89. In a cement sole-attaching machine, the combination of a pad, means for pressing a shoe on the pad, sole-engaging means arranged for movement only in the longitudinal median plane of a sole on the pad, shoe-positioning means comprising a pair of fingers arranged for movement longitudinally of the shoe and for equal and opposite movement toward and from the shoe, and means controlled by movement of the shoe-pressing means for moving the fingers longitudinally of the shoe and closing them upon the shoe.

90. In a machine for cement-attaching soles to shoes, the combination of a pad, a pad box therefor, a support mounted on the pad box, sole-engaging means mounted on said support for movement longitudinally of the pad for locating a sole with its longitudinal median line in coincidence with the longitudinal median line of the pad, shoe-engaging fingers mounted on said support for movement independent of the sole-engaging means parallel to said median line and for equal and opposite movement transversely of said line, and means for closing said fingers upon the shoe to centralize the shoe with respect to said median line.

91. In a cement sole-attaching machine, the combination of a pad, means movable into and out of position over the pad for pressing a shoe upon the pad, sole-engaging means arranged for movement longitudinally of a sole on the pad, shoe-positioning means comprising a pair of fingers arranged for movement longitudinally of the shoe and for equal and opposite movement toward and from the shoe, and means operated by movement of the shoe pressing means over the pad for moving the fingers longitudinally of the shoe and closing them upon the shoe.

92. In a cement sole-attaching machine, the combination of a pad, shoe-holding means movable into and out of position over a shoe on the pad, sole-locating means comprising a pin to engage a hole in the sole, means for guiding the pin for movement longitudinally of the sole, shoe-positioning fingers mounted for movement longitudinally of the pad and for equal and opposite closing movement, and means operated by movement of the shoe-holding means into position over the shoe for moving the fingers longitudinally of the pad toward the shoe and causing them to close upon the shoe.

93. In a machine for cement-attaching soles to shoes, the combination of a pad box provided with a sole-receiving pad, a pin carrier mounted on the box for movement along the longitudinal median line of the box, a pin on the carrier arranged for movement heightwise of the box and adapted to engage a hole in the heel end of a sole located on the pad, a slide mounted for movement parallel to the carrier, equally and oppositely movable shoe-locating members mounted on the slide, and means for operating the shoe-locating members to position the shoe relatively to the sole.

94. In a cement sole-attaching machine, the combination of a pad, shoe-holding means movable into and out of position over a shoe on the pad, means for locating a sole centrally laterally of the pad, shoe-positioning fingers mounted for movement longitudinally of the pad and for equal and opposite closing movement, means controlled by movement of the shoe-holding means into position over the shoe for advancing the fingers and causing them to close upon the shoe, and means for locking the fingers in shoe-engaging position.

95. In a machine for cement-attaching soles to shoes, the combination of a pad box provided with a sole-receiving pad, a pin carrier mounted on the box for movement along the longitudinal median line of the box, a pin on the carrier arranged for movement heightwise of the box and adapted to engage a hole in the heel end of a sole located on the pad, a slide mounted for movement parallel to the carrier, equally and oppositely movable shoe-engaging members mounted on the slide, and means for operating the shoe-engaging members to locate the shoe relatively to the sole and to hold the shoe against movement laterally of the pad.

96. In a cement sole-attaching machine, the combination of a pad, shoe-holding means movable into and out of position over a shoe on the pad, sole-locating means comprising a pin to engage a hole in the sole, means for guiding the pin for movement longitudinally of the sole, shoe-positioning fingers mounted for movement longitudinally of the pad and for equal and opposite closing movement, and means controlled by movement of the shoe-holding means into position over the shoe for advancing the fingers, causing them to close upon the shoe and locking them in closed position.

97. In a machine for cement-attaching soles to shoes, the combination of a pad box provided with a sole-receiving pad, a pin carrier mounted on the box for movement along the longitudinal median line of the box, a pin on the carrier arranged for movement heightwise of the box and adapted to engage a hole in the heel end of a sole located on the pad, a slide mounted for movement parallel to the carrier, equally and oppositely movable shoe-engaging members mounted on the slide, means for operating the shoe-engaging members to locate the shoe relatively to the sole, and means for locking the members in shoe-engaging position.

98. In a machine for cement-attaching soles to shoes, the combination of a pad, means movable into and out of position over the pad for pressing a shoe upon the pad, means for locating a sole on the pad, means for locating a shoe on the sole, said shoe-locating means comprising equally and oppositely movable members which are also movable longitudinally of the pad, and means controlled by movement of the shoe-pressing means over the pad for causing the shoe-locating means to move longitudinally of the shoe.

99. In a machine for cement-attaching soles to shoes, the combination of a pad, means movable into and out of position over the pad for pressing a shoe upon the pad, means for locating a sole centrally of the pad, means for locating the shoe on the sole, said shoe-locating means being movable longitudinally of the pad, means controlled by movement of the shoe-pressing means over the pad for causing the shoe-locating means to move longitudinally of the shoe to locate the shoe centrally of the sole, means locking the shoe-locating means in operative position, and means operated by movement of the shoe-pressing means for unlocking the shoe-locating means.

100. In a cement sole-attaching machine, the combination of a pad, an upper and a lower plate located at each side of the pad and arranged for relative adjustment transversely of the pad, a pair of sole gages carried by each lower plate, a pair of shoe gages carried by each upper plate, and means for moving each upper plate relatively to its lower plate to adjust its pair of shoe gages relatively to its pair of sole gages.

101. In a cement sole-attaching machine, the combination of a pad, a plate at each side of the forepart of the pad, each plate being pivoted between its ends to an arm pivoted at the front end of the pad, means for effecting equal and opposite movement of said arms, a pair of sole gages carried by each of said plates, a pair of shoe gages arranged above each pair of sole gages, and means for moving each pair of shoe gages bodily relatively to the corresponding pair of sole gages transversely of the pad.

102. In a cement sole-attaching machine, the combination of a pad, an upper and a lower plate located at each side of the pad, a pair of sole gages carried by the lower plate, a pair of shoe gages carried by the upper plate, a spline connection between the upper and lower plates, and screw means for moving the upper plate relatively to the lower plate to adjust the shoe gages relatively to the sole gages.

103. In a cement sole-attaching machine, the combination of a pad, a plate at each side of the forepart of the pad, a pair of arms pivoted at the front end of the pad, means for effecting equal and opposite movement of said arms, a plate pivoted to the end of each arm, a pair of sole gages carried by each of said plates, a pair of shoe gages arranged above each pair of sole gages, and means for moving each pair of shoe gages bodily relatively to the corresponding pair of sole gages transversely of the pad in a straight line.

104. In a cement sole-attaching machine, the combination of a pad, an upper plate and a lower plate located at each side of the pad and each lower plate being arranged for adjustment transversely of the pad relatively to the corresponding upper plate, a pair of sole gages at each side of the pad carried by each lower plate, and a pair of shoe gages at each side of the pad carried by each upper plate.

105. In a cement sole-attaching machine, the combination of a pad box, a pad in said box, a mask plate at each side of the forepart of the pad, arms pivoted to the front end of the pad box to each of which one mask plate is pivoted, means for effecting equal and opposite movement of said arms, a pair of sole gages carried by each of said mask plates, a plate overlying each mask plate and carrying a pair of shoe gages, said gages being arranged above each pair of sole gages, and means for moving each overlying plate relatively to the corresponding mask plate to adjust the shoe gages transversely of the pad relatively to the sole gages.

106. In a cement sole-attaching machine, the combination of a pad, and shoe gages for locating a shoe on the pad, said gages being located approximately at the ends of the tip and at the ends of the ball line, each gage having a cylindrical concave shoe-engaging face, each gage being mounted for limited movement about an axis extending heightwise of the shoe.

107. In a cement sole-attaching machine, the combination of a pad, and shoe gages for locating a shoe on the pad, said gages being located approximately at the ends of the tip and at the ends of the ball line, each gage having a cylindrical concave shoe-engaging face, each gage having limited bodily movement in a direction heightwise of the shoe.

108. In a cement sole-attaching machine, the combination of a pad, sole gages, and shoe gages for locating a shoe on the pad, said gages being located approximately at the ends of the tip and at the ends of the ball line, each shoe gage having a cylindrical concave shoe-engaging face, each shoe gage being mounted for limited movement about an axis extending heightwise of the shoe, and each shoe gage having limited bodily movement in the direction of said axis.

109. In a machine for applying pressure to shoe bottoms, the combination of a turret, a plurality of pads on the turret, sets of sole and shoe locating mechanism for each of the pads, means for controlling operation of each set of locating mechanism as it is brought by rotation of the turret to an operating station, means for controlling rotation of the turret, a stop for preventing operation of the turret-controlling means, and means operated by the means for controlling the locating mechanism for moving said stop to inoperative position.

110. In a machine for applying pressure to shoe bottoms, the combination of a turret, a plurality of pads on the turret, a set of shoe and sole gages for each of the pads, means for moving each set of gages out of operative position as the pad approaches an operating station, manually controlled means at the operating station for permitting operation of the set of gages at that station, means for controlling rotation of the turret, and means for preventing operation of said controlling means until said manual gage control means has been operated.

111. In a machine for applying pressure to shoe bottoms, the combination of a turret, a plurality of pads on the turret, a set of shoe and sole gages for each of the pads, means for moving each set of gages out of operative position as the pad approaches an operating station, manually controlled means at the operating station for permitting operation of the set of gages at that station, means for controlling rotation of the turret, a swinging stop for preventing operation of said controlling means, and means operated by said manually controlled means for swinging the stop to permit operation of the means for controlling rotation of the turret.

112. A pad for use in applying pressure to shoe bottoms comprising a bag adapted to be filled with fluid, said bag having substantially spaced top and bottom walls, and a column integral with one of said walls and free from the other, said column extending from one wall to the other and located under the bottom of a shoe in operative position on the pad.

113. A pad for use in applying pressure to shoe bottoms comprising a fluid-filled bag having top and bottom walls connected by a column located to come under the forepart of the bottom of a shoe in operative position on said pad and firm enough to sustain a substantial part of the sole-attaching pressure, and a similar column located under the shank portion of the shoe so positioned.

114. A pad for use in applying pressure to shoe bottoms comprising a fluid-filled bag having top and bottom walls, a column located to come under the forepart of a shoe in operative position on said bag, said column being connected to the top and bottom walls of the bag, and a column located under the shank portion of the shoe so positioned and connected to one of said walls but free from the other.

SIDNEY J. FINN.